(12) United States Patent
Kawashita et al.

(10) Patent No.: US 10,571,607 B2
(45) Date of Patent: Feb. 25, 2020

(54) COLOR DEVELOPING STRUCTURE AND METHOD OF PRODUCING THE SAME

(71) Applicant: TOPPAN PRINTING CO., LTD., Tokyo (JP)

(72) Inventors: Masashi Kawashita, Tokyo (JP); Mai Ooki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 143 days.

(21) Appl. No.: 15/860,532

(22) Filed: Jan. 2, 2018

(65) Prior Publication Data
US 2018/0143358 A1    May 24, 2018

Related U.S. Application Data

(63) Continuation of application No. PCT/JP2016/003317, filed on Jul. 13, 2016.

(30) Foreign Application Priority Data

Jul. 13, 2015 (JP) .................................. 2015-139969
Jun. 14, 2016 (JP) .................................. 2016-117909

(51) Int. Cl.
*G02B 5/18* (2006.01)
*B32B 7/02* (2019.01)
(Continued)

(52) U.S. Cl.
CPC .............. *G02B 5/1861* (2013.01); *B32B 3/30* (2013.01); *B32B 7/02* (2013.01); *B32B 38/0012* (2013.01);
(Continued)

(58) Field of Classification Search
CPC .. G02B 5/1861; G02B 5/1852; G02B 5/1842; G02B 5/1847
(Continued)

(56) References Cited

U.S. PATENT DOCUMENTS

| 4,155,627 A * | 5/1979 | Gale | G02B 5/1857 |
| | | | 359/568 |
| 6,424,436 B1 * | 7/2002 | Yamanaka | G02B 5/1833 |
| | | | 235/462.01 |

(Continued)

FOREIGN PATENT DOCUMENTS

| JP | 2000-246829 A | 9/2000 |
| JP | 2003-053875 A | 2/2003 |

(Continued)

OTHER PUBLICATIONS

International Search Report with English Translation and Written Opinion Received in International Application No. PCT/JP2016/003317 dated Oct. 18, 2016.

(Continued)

*Primary Examiner* — Audrey Y Chang
(74) *Attorney, Agent, or Firm* — Foley & Lardner LLP

(57) ABSTRACT

A color developing structure capable of achieving multi-hued color through a simple process, and a method of producing the same are provided. In the color developing structure formed on a surface of a base material: the color developing structure has a rectangular shape in plan view, and is formed of a concavo-convex structure having a plurality of convexities with different heights and a laminated film including a plurality of layers laminated on the concavo-convex structure; the plurality of layers adjoining in a lamination direction are made of materials that transmit light of the same wavelength band and have different refractive indices with respect to light of the wavelength band; and the plurality of layers have about the same thickness.

15 Claims, 12 Drawing Sheets

(51) Int. Cl.
*B32B 3/30* (2006.01)
*B32B 38/00* (2006.01)

(52) U.S. Cl.
CPC ........ *G02B 5/1852* (2013.01); *B32B 2551/00* (2013.01)

(58) Field of Classification Search
USPC ..... 359/566, 567, 568, 576, 569; 283/72, 75
See application file for complete search history.

(56) References Cited

U.S. PATENT DOCUMENTS

| | | | | |
|---|---|---|---|---|
| 7,009,768 B2* | 3/2006 | Sakamoto | ............ | G02B 5/1847 216/24 |
| 7,722,194 B2* | 5/2010 | Amako | ................ | G02B 5/1842 349/114 |
| 2012/0236415 A1* | 9/2012 | Nagano | ................ | G02B 5/1842 359/567 |
| 2015/0210106 A1* | 7/2015 | Sun | ........................ | B42D 25/29 283/85 |
| 2015/0362642 A1 | 12/2015 | Nagano | | |

FOREIGN PATENT DOCUMENTS

| | | |
|---|---|---|
| JP | 2003-227923 A | 8/2003 |
| JP | 2005-153192 A | 6/2005 |
| JP | 2007-108208 A | 4/2007 |
| JP | 2007-225935 A | 9/2007 |
| JP | 2008-233615 A | 10/2008 |
| JP | 2009-025558 A | 2/2009 |
| JP | 2011-145657 A | 7/2011 |
| WO | WO-2014/129202 A1 | 8/2014 |

OTHER PUBLICATIONS

Extended European Search Report dated Feb. 22, 2019 in corresponding application No. 16824083.6.
Japanese Office Action dated May 22, 2018 in corresponding application No. 2017-137299.

* cited by examiner

COLOR DEVELOPING STRUCTURE AND METHOD OF PRODUCING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/003317, filed on Jul. 13, 2016, which claims priority to Japanese Patent Application No. 2015-139969, filed Jul. 13, 2015, and Japanese Patent Application No. 2016-117909, filed Jun. 14, 2016, the entireties of which are hereby incorporated by reference.

TECHNICAL FIELD

The present invention relates to a color developing structure that develops color through a structure formed on a surface of the color developing structure, and a method of producing the color developing structure.

BACKGROUND ART

There is a color developing phenomenon created by periodic structures having a wavelength comparable to or smaller than the wavelength of light. In this color developing phenomenon, colors are developed by exclusively reflecting or transmitting light having a specific wavelength, through diffraction, interference and diffusion ascribed to the periodic structures, although the substances in the structures have no light absorbability. This color developing phenomenon is different from the one created by pigments, through electron transition ascribed to light absorption. Hereinafter, in the present specification, this color developing phenomenon using periodic structures is referred to as structural color development.

When periodic structures are formed, for example, of inorganic dielectric materials that are not deteriorated by ultraviolet light, the structural color development will not be impaired, as long as the structures are retained, even if the structures are left exposed to ultraviolet light.

Further, structural color development through diffraction and interference is characterized in that the recognized wavelength of light changes, depending on the observation angle, and therefore expressions with high designability can be accomplished.

As a color developing member for such structural color development, a color developing structure utilizing multilayer film interference is being proposed (Patent Literature 1). This color developing structure includes a multilayer structure made of polymer materials having different refractive indices.

The color developing structure proposed in Patent Literature 1 has a multilayer structure made of polymer materials, and therefore there is only a small difference in refractive index of the materials forming the adjoining layers. Therefore, it is necessary to laminate a number of layers to accomplish intense reflection and thus the production cost increases. In addition, in the proposed structure, the influence of the multilayer film interference becomes dominant, and the color change depending on the observation angle becomes abrupt. Therefore, it is difficult to express specific colors.

As measures against these problems, another type of color developing member is being proposed (Patent Literature 2). This color developing member provides intense reflection, and exhibits a moderate color change depending on the observation angle, as do Morpho butterflies inhabiting a natural environment.

CITATION LIST

Patent Literature

Patent Literature 1: JP 2000-246829 A
Patent Literature 2: JP 2005-153192 A

SUMMARY OF THE INVENTION

Technical Problem

However, it is difficult for the color developing member proposed in Patent Literature 2 to accomplish multi-hued color through a simple process.

Accordingly, the present invention has an object of providing a color developing structure capable of accomplishing multi-hued color through a simpler process, and a method of producing the same.

Solution to Problem

The present invention provides a color developing structure formed on a surface of a base material, and is characterized in that the color developing structure has a rectangular shape in plan view, and is formed of a concavo-convex structure having a plurality of convexities with different heights and a laminated film including a plurality of layers laminated on the concavo-convex structure; the plurality of layers adjoining in a lamination direction are made of materials that transmit light of the same wavelength band and have different refractive indices with respect to light of the wavelength band; and the plurality of layers have about the same thickness.

Further, the present invention provides a method of producing a color developing structure including a base material, a concavo-convex structure formed in a surface of the base material or on the base material, and a laminated film laminated on the concavo-convex structure, and is characterized in that the method includes: a step of preparing an imprinting mold having a predetermined structure formed on a surface of the mold; a step of forming the concavo-convex structure by transferring the structure formed on the mold to the base material by photo imprinting or thermal imprinting; and a step of forming the laminated film on the concavo-convex structure transferred to the base material by laminating materials that transmit light of the same wavelength band and have different refractive indices with respect to light of the wavelength band. In the method, the laminated film is formed of a plurality of layers and the plurality of layers has about the same thickness.

Advantageous Effects of the Invention

The present invention provides a color developing structure that can accomplish multi-hued color through a simpler process, and a method of producing the same.

DESCRIPTION OF REPRESENTATIVE EMBODIMENTS

It is to be understood that the description of the embodiments and Examples below are intended to be representative of the present invention, and that the present invention is not necessarily limited to the embodiments. Modifications to these embodiments and Examples could be made by one of ordinary skill in the art and still be within the scope of the present invention.

[First Embodiment]

In a first embodiment, a wavelength band which a color developing structure acts on is determined by the line width and array pitches of convexities (concavities) forming a concavo-convex structure, and the refractive indices and thicknesses of laminated films formed on the concavo-convex structure. In the first embodiment, the wavelength band which the color developing structure acts on as a target is not limited. However, in the first embodiment, description is focused on a color developing structure targeting light of a visible region, in particular, referring to the figures. In the first embodiment, the visible region refers to light in a wavelength band in the range of 360 nm to 830 nm.

Figure 1A:
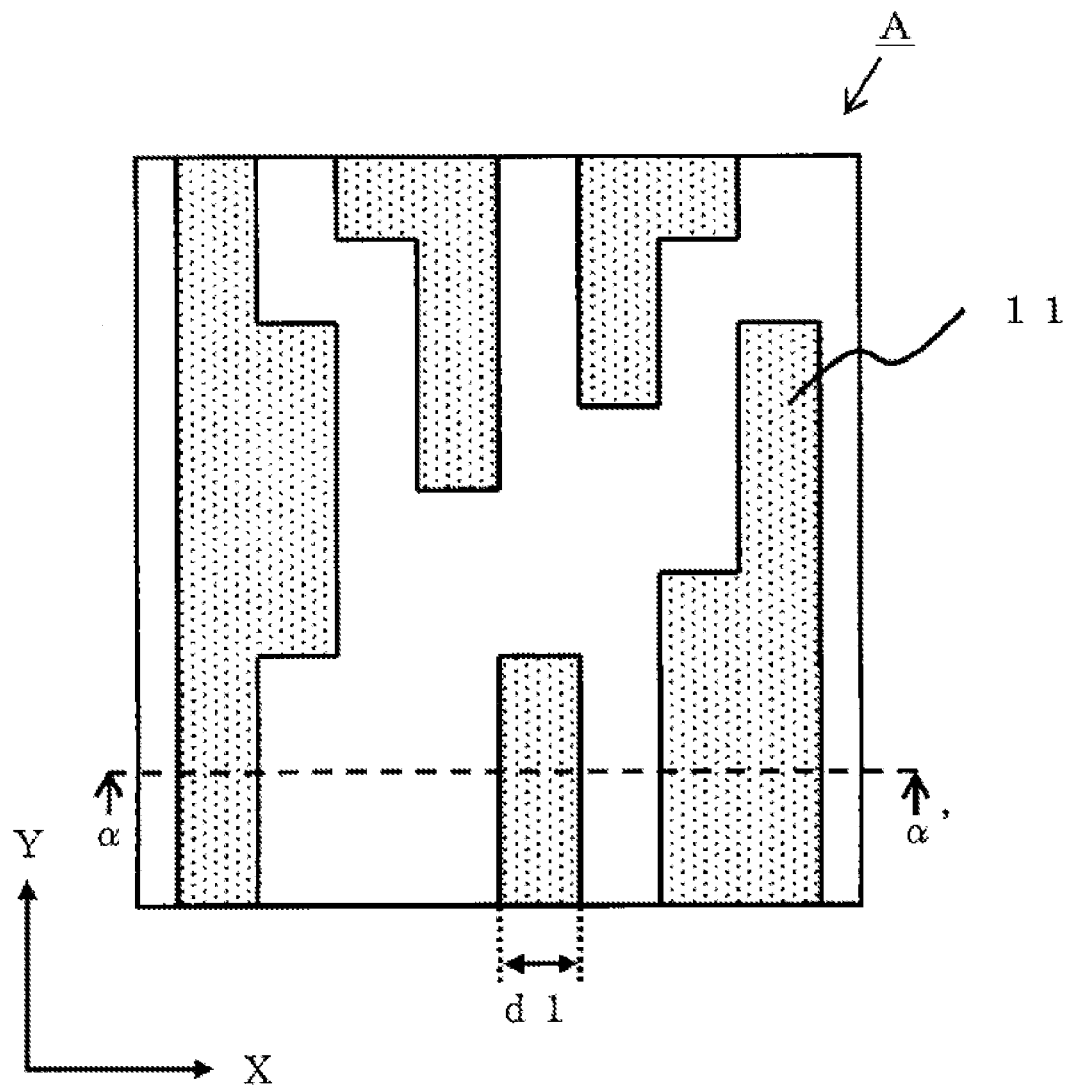
FIG. 1A is a schematic diagram illustrating a concavo-convex structure A provided to induce a light dispersion effect in a color developing structure, according to a first embodiment.
Figure 1B:
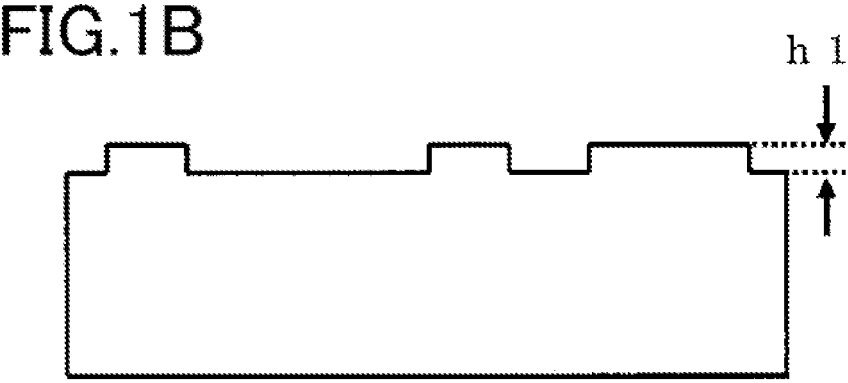
FIG. 1B is a schematic diagram illustrating the concavo-convex structure A provided to induce the light dispersion effect in the color developing structure, according to the first embodiment.

FIGS. 1A and 1B are schematic diagrams each illustrating a concavo-convex structure A provided to induce a light dispersion effect in the color developing structure of the first embodiment. FIG. 1A is a schematic plan view, and FIG. 1B is a schematic cross-sectional view taken along the line α-α' of FIG. 1A. For the sake of convenience, in FIG. 1A, the direction in which the convexities forming the concavo-convex structure are arrayed in parallel is taken to be an x-direction, and the direction perpendicular to the x-direction and parallel to the direction in which the convexities extend is taken to be a y-direction. These directions are specified using the x-axis and the y-axis.

The concavo-convex structure A shown in FIG. 1A has flat convexities (protrusions) 11 made up of rectangles each having a line width of d1 in the x-direction and a line length of d1 or more in the y-direction. The rectangles are arrayed so as to overlap with one another neither in the x-direction nor in the y-direction. The line lengths in the y-direction of the rectangles forming the flat convexities 11 are selected from a population having a predetermined standard deviation. In the case of a color developing structure in the visible region, d1 is preferably 830 nm or less. For example, in the case of a blue color developing structure, d1 is preferably in the order of 300 nm. In the example of FIG. 1A, the rectangles configuring the convexities 11 are arrayed such that the rectangles do not overlap with one another in the x-direction. Therefore, in the example of FIG. 1A, the width in the x-direction of one convexity 11 is an integral multiple of d1.

It should be noted that the rectangles configuring the convexities 11 may be arrayed such that the rectangles overlap with one another in the x-direction to form the flat convexities 11, and the width of one convexity 11 does not necessarily have to be an integral multiple of d1. Even when the width of one convexity 11 is not an integral multiple of d1, a light dispersion effect can be induced.

The concavo-convex structure A may have a structural height h1 designed to take an optimal value depending on the wavelength of light reflected at the surface of the color developing structure. A diffraction effect can be obtained as long as the structural height h1 is larger than the surface roughness of the laminated film described later. However, when the structural height h1 is excessively large, the diffusion effect of light is intensified and the chroma of the light reflected at the surface of the laminated film is impaired. Therefore, in the case of a color developing structure where a target wavelength band is in the visible region, it is preferable that h1 is generally in the range 10 nm to 200 nm. For example, in a blue color developing structure, it is preferable that h1 be in the order of 40 to 150 nm to achieve an effective diffusion of light. To reduce the diffusion effect, the structural height h1 is preferably 100 nm or less in a blue color developing structure.

Figure 2A:
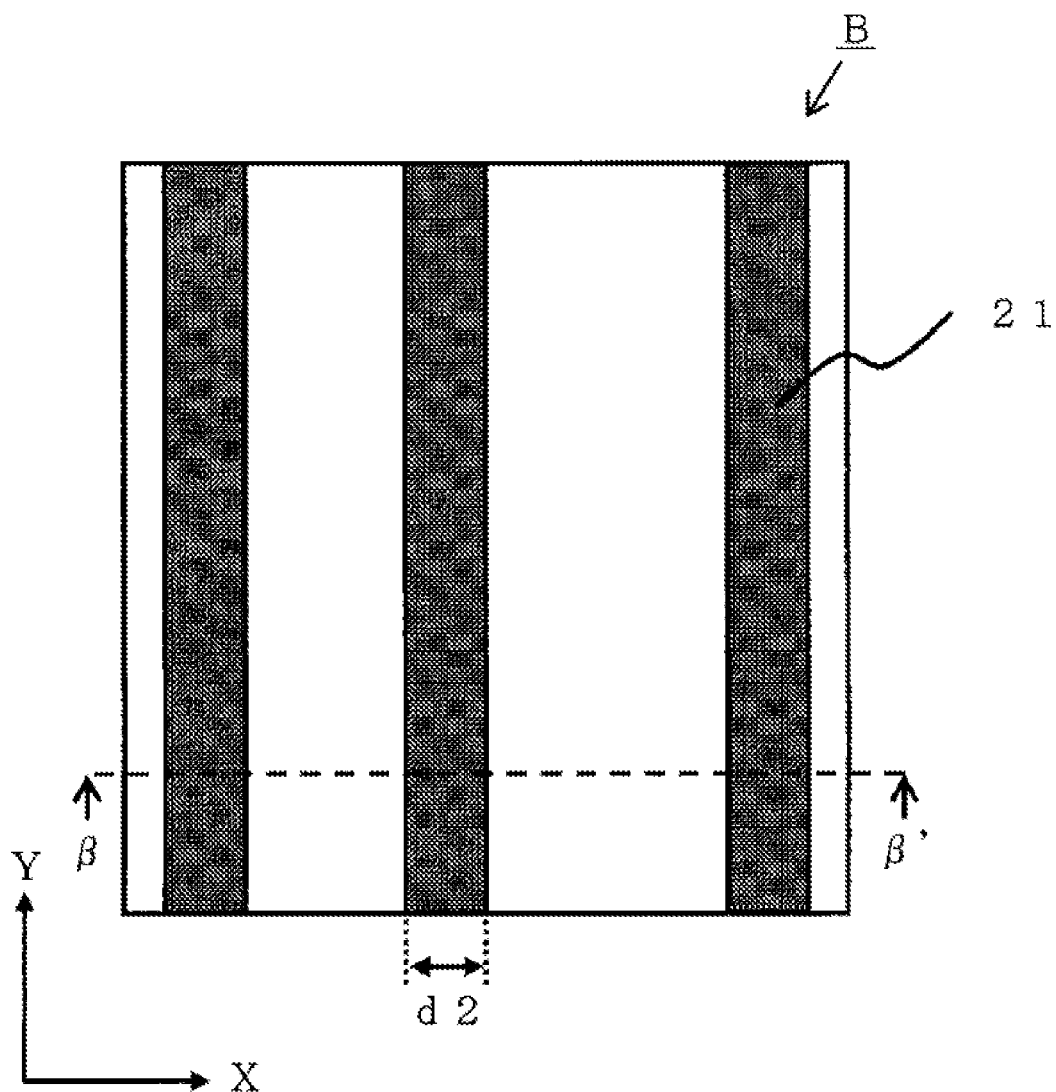
FIG. 2A is a schematic diagram illustrating a concavo-convex structure B provided to induce a diffraction effect in the color developing structure, according to the first embodiment.
Figure 2B:
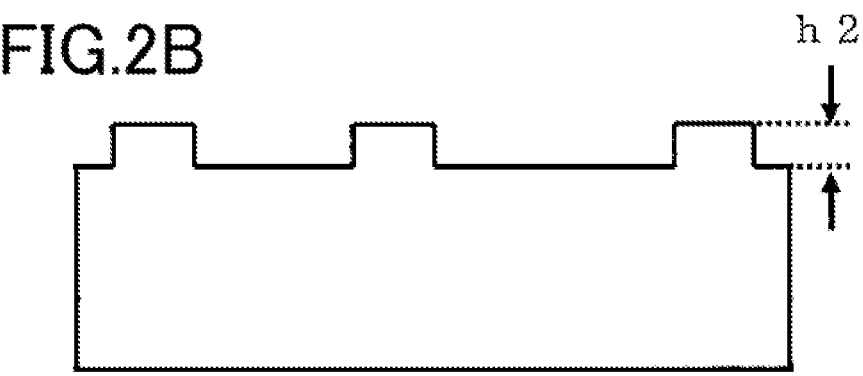
FIG. 2B is a schematic diagram illustrating the concavo-convex structure B provided to induce a diffraction effect in the color developing structure, according to the first embodiment.

FIGS. 2A and 2B are schematic diagrams illustrating a concavo-convex structure B provided to induce diffraction in the color developing structure of the first embodiment. FIG. 2A is a schematic plan view, and FIG. 2B is a schematic cross-sectional view taken along the line β-β' of FIG. 2A.

The concavo-convex structure B shown in FIG. 2A is formed being overlapped with the concavo-convex structure A shown in FIG. 1A, and is configured by convex linear structures (protruding strips) 21. The x- and y-directions shown in FIG. 2A denote the same directions as the x- and y-directions shown in FIG. 1A, respectively. The linear structures 21 are designed such that at least part of the reflection is observed as first order diffracted light (diffraction order m=±1). Therefore, when the incident angle, reflection angle and wavelength of diffracted light are designated as θ, φ and λ, respectively, then an array pitch d of the linear structures 21 in the x-direction needs to fulfill an inequality $d \geq \lambda/(\sin \theta + \sin \phi)$. For example, when visible light of λ=360 nm is targeted, the array pitches of the linear structures 21 only need to be 180 nm or more.

The linear structure 21 has a line width d2 in the x-direction which may be equal to or different from the line width d1 of the concavo-convex structure A shown in FIG. 1A.

The array pitches of the linear structures 21 are reflected on the periodicity of the concavo-convex structure of the outermost surface of a laminated film described latter. Therefore, when the array pitches of the linear structures 21 are constant, light having a specific wavelength is reflected at a specific angle due to the diffraction phenomenon at the surface of the color developing structure. The reflection intensity of light reflected due to the diffraction phenomenon is extremely high compared to the reflection intensity of light obtained due to the light dispersion effect of the concavo-convex structure A shown in FIG. 1A. Therefore, intense light resembling a metallic luster can be visually recognized; however, the light is dispersed in relation to a change in observation angle. Specifically, the concavo-convex structure A shown in FIG. 1A may be designed to serve as a color developing structure exhibiting a blue color, for example. In this case, however, if the array pitches of the linear structures 21 are designed to be constant in the order of 400 nm to 5 μm, surface reflection of intense green to red colors will be generated by diffraction, depending on the observation angle. If the array pitches of the linear structures 21 are designed to be larger in the order of 50 μm, for example, the angular range of light diffracted in the visible region is narrowed, and therefore colors having a specific wavelength are unlikely to be visually recognized, but only a glitter like metallic luster is exhibited at a specific observation angle.

In the case where the linear structures 21 are formed by overlapping a plurality of periodic structures having different periodicity, wavelengths of light reflected by a diffraction phenomenon are intermingled, and therefore dispersed light of high monochromaticity is unlikely to be visually recognized. However, as the standard deviation of periodicity becomes larger, the diffusion effect becomes more dominant, and intense reflection produced by a diffraction phenomenon is not obtained.

In this regard, the periodicity of the linear structures 21 can be determined based on a diffusion angle which depends on the light dispersion effect exerted by the concavo-convex structure A shown in FIG. 1A. For example, blue light may be diffused in an angular range of ±40° with respect to the incident angle. In this case, if the array pitches of the linear structure 21 are in the order of 1 to 5 μm with a standard deviation being in the order of 1 μm, reflection due to the diffraction phenomenon is generated in an angular range commensurate with the diffusion angle due to the light dispersion effect of the concavo-convex structure A.

To produce a diffraction phenomenon of longer periodicity, the linear structures 21 may be formed with an average array pitch being in the order of 1 to 5 μm and with a standard deviation being in the order of 1 μm, for location in a rectangular region having sides of 10 to 100 μm, and such rectangular regions may be arrayed without overlapping the adjacent regions.

Further, the linear structures 21 having a given periodicity may be formed in the rectangular region having sides of 10 to 100 μm, with the structural period being selected from a range 1 to 5 μm. In this case as well, an equivalent effect can be anticipated with the resolution of the human eyes, as long as the periodicity of the linear structures of either of adjoining rectangular regions differs from the other within a range of variation that is comparable to a standard deviation of 1 μm.

The linear structures 21 of FIG. 2A are arrayed only in the x-direction. However, the light dispersion effect exerted by the concavo-convex structure A shown in FIG. 1A partially has an influence in the y-direction as well. Therefore, the linear structures 21 of FIG. 2A may also have periodicity in the y-direction. In this case, the average of array pitches of the linear structures 21 in the x- and y-directions may be 1 μm or more and 100 μm or less. Further, the periodicity of the linear structures 21 may be designed such that the average value and/or standard deviation of the array pitches differ, depending on the influence of the light dispersion effect, in the x- and y-directions, of the concavo-convex structure A shown in FIG. 1A.

The linear structure 21 has a structural height h2 larger than the surface roughness of a laminated film described later, similarly to the structural height h1 of the convexity 11 of the concavo-convex structure A. However, as the value of h2 increases, the diffraction effect of the linear structures 21 becomes more dominant. In addition to the diffraction efficiency becoming excessively high due to the linear structures 21, the diffusion effect of the concavo-convex structure is enhanced by the multilevel structure. Therefore, there is a concern that the light dispersion effect of the concavo-convex structure A shown in FIG. 1A cannot be sufficiently obtained. Therefore, h2 may preferably be comparable with or equal to h1. For example, in a blue color developing structure, h2 is preferably in the order of 10 to 150 nm.

Figure 3A:
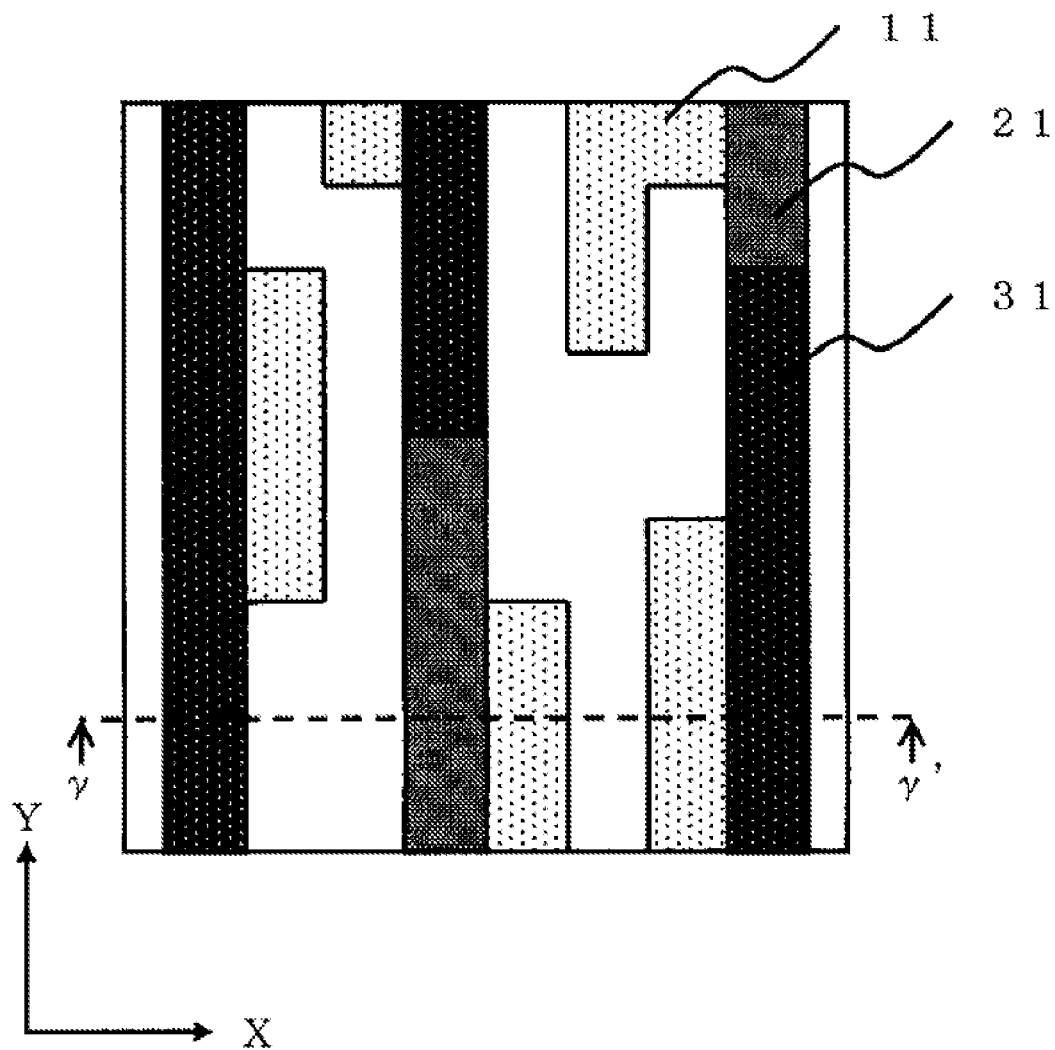
FIG. 3A is a schematic diagram illustrating a concavo-convex structure formed by overlapping the concavo-convex structure A shown in FIG. 1A with the concavo-convex structure B shown in FIG. 2A.
Figure 3B:
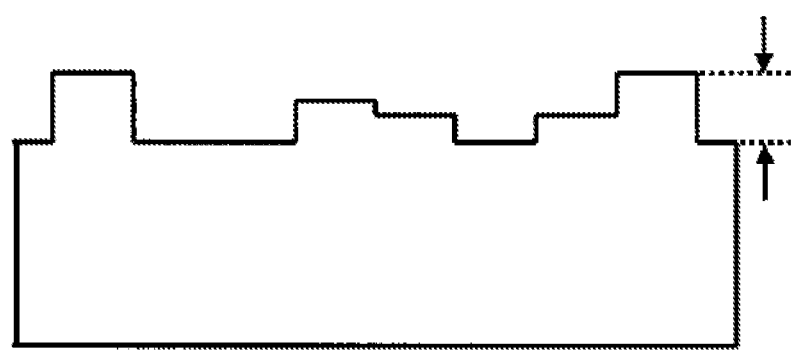
FIG. 3B is a schematic diagram illustrating the concavo-convex structure formed by overlapping the concavo-convex structure A shown in FIG. 1A with the concavo-convex structure B shown in FIG. 2A.

FIGS. 3A and 3B are schematic diagrams illustrating a concavo-convex structure obtained by overlapping the concavo-convex structure A shown in FIG. 1A with the concavo-convex structure B shown in FIG. 2A. FIG. 3A is a schematic plan view, and FIG. 3B is a schematic cross-sectional view taken along the line y-y' of FIG. 3A. The x- and y-directions shown in FIG. 3A denote the same directions as the x- and y-directions shown in FIGS. 1A and 2A, respectively.

The concavo-convex structure includes overlapped portions 31 in each of which the convexity 11 of the concavo-convex structure A shown in FIG. 1A overlaps the linear structure 21 of the concavo-convex structure B shown in FIG. 2A. Each overlapped portion 31 has a height that is a sum of h1 and h2. This color developing structure is designed such that the concavo-convex structure A for inducing the light dispersion effect and the concavo-convex structure B for inducing the diffraction phenomenon are overlapped with each other. However, the effect of the present invention can also be obtained if the color developing structure is designed such that the concavo-convex structures are not overlapped with each other. However, in this case, the concavo-convex structure for inducing the light dispersion effect cannot be formed in the region where the linear structures 21 are formed, and the region for forming the concavo-convex structure for inducing the light diffusion effect becomes small. Therefore, the structure is preferably a multilevel structure as shown in FIG. 3A.

To create the concavo-convex structure shown in FIG. 3A on a base material, a well-known technique, such as electron beam or optical lithography and dry etching, may be used.

Figure 4A:
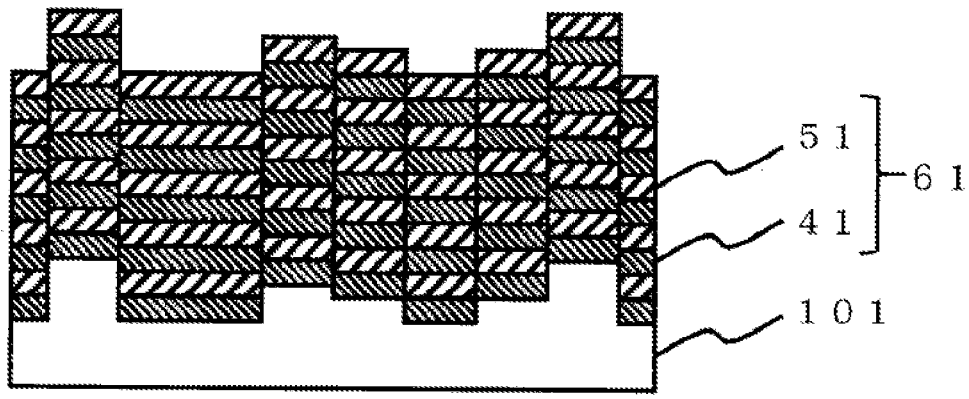
FIG. 4A is a schematic cross-sectional view illustrating an example of the color developing structure, according to the first embodiment.
Figure 4B:
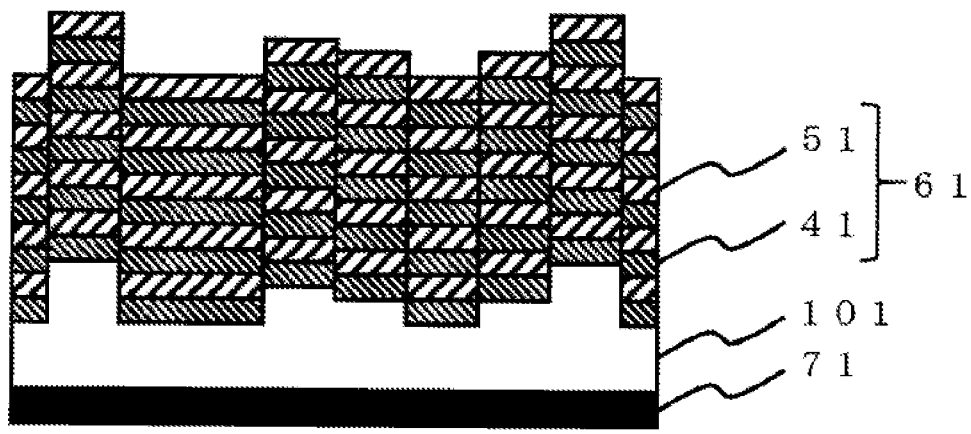
FIG. 4B is a schematic cross-sectional view illustrating an example of the color developing structure, according to the first embodiment.

FIGS. 4A and 4B are schematic cross-sectional views illustrating an example of a color developing structure according to the first embodiment. The color developing structure shown in FIG. 4A includes a base material 101 and a laminated film 61 formed on the base material 101. The base material 101 is made of synthetic quartz, with its surface being formed with the concavo-convex structure shown in FIG. 3A. The laminated film 61 includes 10 layers made of two materials that are transparent and have different refractive indices with respect to light in the visible region. The laminated film 61 is configured by alternately laminating high refractive index layers 41 and low refractive index layers 51. A high refractive index layer 41 is formed on the surface of the base material 101, and a low refractive index layer 51 is formed at the outermost surface of the color developing structure. The wavelength of light reflected at the surface of the laminated film 61 is determined by the refractive indices of the materials forming the high refractive index layers 41 and the low refractive index layers 51, film thicknesses, and the refractive index of the base material 101. Therefore, the laminated film 61 may be designed using a transfer matrix method or the like so that light with a desired wavelength is reflected. Further, as the difference in refractive index becomes larger between the material forming the high refractive index layers 41 and the material forming the low refractive index layers 51, a higher refractive index can be obtained with fewer laminated layers. For example, when inorganic materials are used, it is preferable to use titanium dioxide ($TiO_2$) for the high refractive index layers 41 and silicon dioxide ($SiO_2$) for the low refractive index layers 51. For example, in the case of a blue color developing structure, it is preferable that the thickness of $TiO_2$ is in the order of 40 nm, and the thickness of $SiO_2$ is in the order of 75 nm. However, as long as there is a difference in refractive index between the materials forming adjoining layers, reflection occurs at the interface. Therefore, the combination of materials is not limited to the one mentioned above. Further, in the case of forming the laminated film 61 with the inorganic materials mentioned above, a well-known technique can be used, such as sputtering, atomic layer deposition, or vacuum vapor deposition. The materials forming the laminated film 61 may be organic materials. In the case of forming the laminated film 61 with organic materials, a well-known technique, such as self-organization, can be used.

The materials forming the color developing structure shown in FIG. 4A are all transparent to light in the visible region. Accordingly, the color developing structure transmits light other than the light in a reflecting wavelength band. Therefore, when the rear surface of the base material 101 is, for example, white paper, the light in the wavelength band transmitted by the color developing structure is unavoidably visually recognized as a color. Therefore, as shown in FIG. 4B, an absorption layer 71 made of a material, such as carbon, may be formed on the rear surface of the base material to absorb light in the visible region. The absorption layer 71 absorbs light that has been transmitted through the color developing structure and improves the contrast of light reflected by the color developing structure.

To form the concavo-convex structure shown in FIG. 3A, thermal or optical nanoimprinting can be applied using an original plate that has been prepared by a well-known technique, such as a combination of electron beam or optical lithography with dry etching.

Figure 5A:
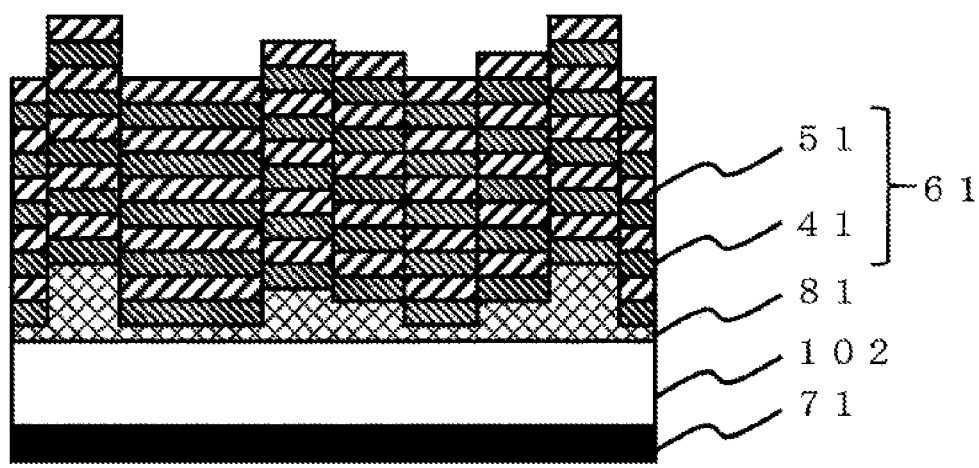
FIG. 5A is a schematic cross-sectional view illustrating another example of the color developing structure, according to the first embodiment.
Figure 5B:
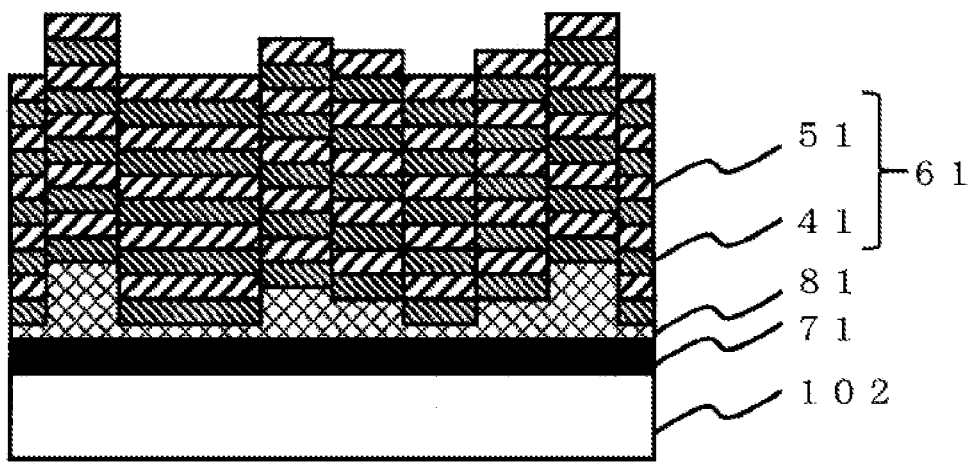
FIG. 5B is a schematic cross-sectional view illustrating another example of the color developing structure, according to the first embodiment.
Figure 5C:
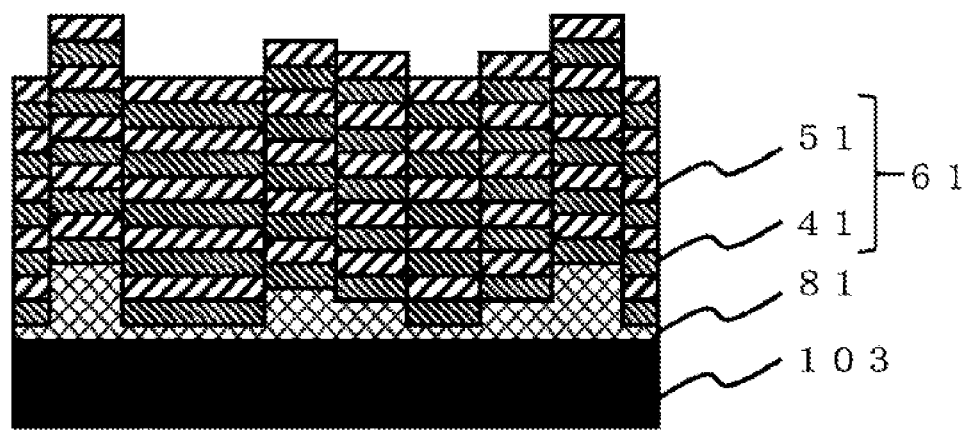
FIG. 5C is a schematic cross-sectional view illustrating another example of the color developing structure, according to the first embodiment.

FIGS. 5A to 5C are schematic cross-sectional views illustrating another example of the color developing structure of the first embodiment. The color developing structure shown in FIG. 5A includes the concavo-convex structure shown in FIG. 3A formed through optical nanoimprinting. More specifically, this concavo-convex structure is formed by applying a photo-curable resin 81 onto a surface of a base material 102, and forming the concavo-convex structure shown in FIG. 3A in the photo-curable resin through optical nanoimprinting, followed by forming the laminated film 61 and the absorption layer 71. The absorption layer 71 may be formed in advance on the rear surface of the base material 102 before application of the photo-curable resin 81. However, in this case, the light used for curing the photo-curable resin 81 needs to be irradiated not from the rear surface side of the base material 102, but from the front surface side of the base, that is, from the original plate side. When this method is used, the base material 102 does not need to have the transmissivity of the wavelength of the light irradiated at the time of optical nanoimprinting. As shown in FIG. 5B, the absorption layer 71 may be formed on the surface of the base material 102, and the photo-curable resin 81 may be applied onto the surface of the absorption layer 71, followed by optical nanoimprinting. As shown in FIG. 5C, the color developing structure may include a base material 103 made of a material that absorbs light in the visible region. For example, a carbon nanotube-dispersed polymer film may be used as the material for forming the base material 103.

In a conventional concavo-convex structure, when the height of the structure is increased to enhance the light dispersion effect, color change due to the change in observation angle becomes moderate due to the increased light diffusion effect. However, the increase of height may impair color contrast, in addition to causing shifting of the reflection wavelength to the long wavelength side. Further, glossiness may be lost due to the diffusion effect. When a metallic thin film is inserted between the multilayer film and the base material to add glossiness, light in the visible region transmitted through the multilayer film is reflected by the metallic thin film and impairs color contrast. On the other hand, when the height of the concavo-convex structure is decreased to reduce the diffusion effect, light cannot be sufficiently diffused and color change due to the change in observation angle becomes abrupt.

According to the color developing structure and the method of producing the same of the first embodiment, multi-hued color can be accomplished through a simple process. The color developing structure of the first embodiment includes a concavo-convex structure in which the concavo-convex structure A for inducing a light dispersion effect is overlapped with the concavo-convex structure B for inducing a diffraction phenomenon. Accordingly, chroma or glossiness is prevented from being deteriorated in color development, while moderating color change due to the change in observation angle.

[Second Embodiment]

Figure 6:
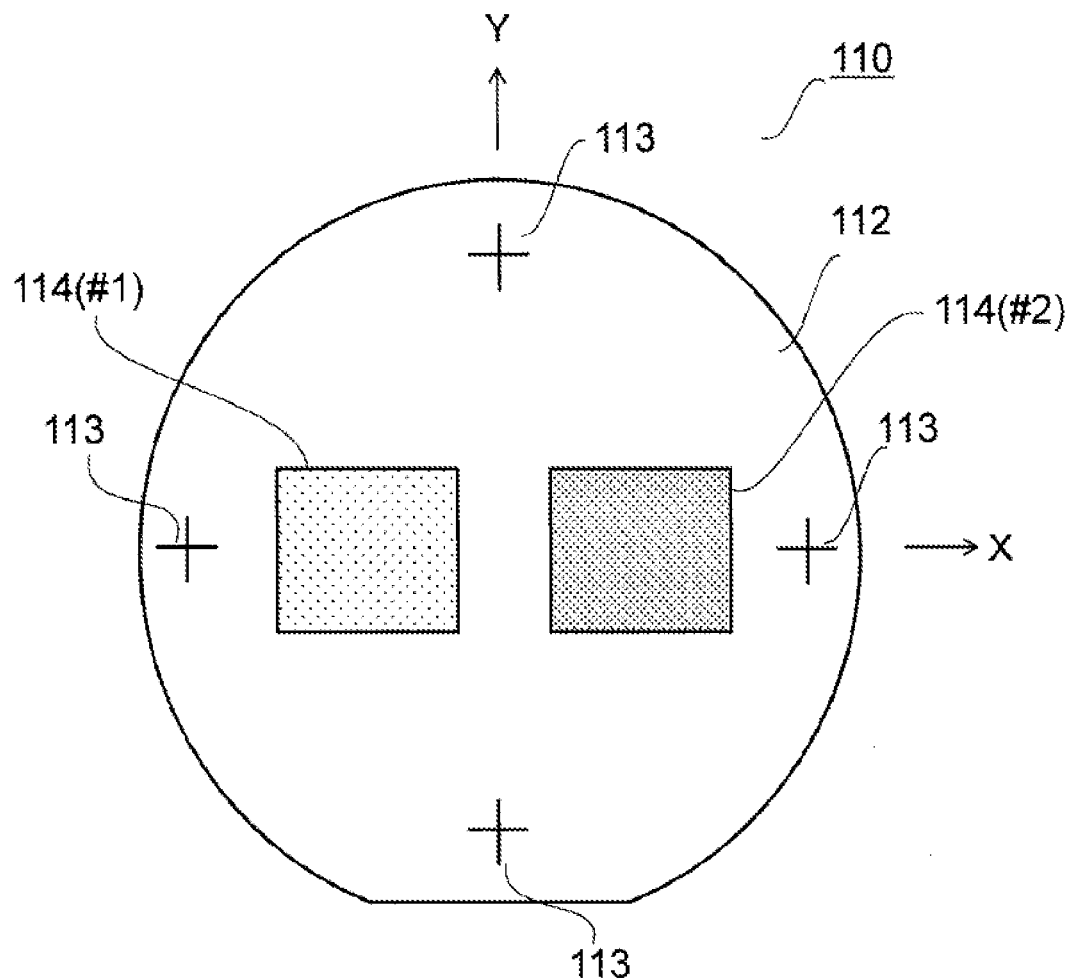
FIG. 6 is a plan view illustrating a configuration example of a display member produced by a method of production, according to a second embodiment.

Referring to FIGS. 6 to 8, a second embodiment of the present invention will be described.

FIG. 6 is a plan view illustrating a configuration example of a display member 110 produced by a method according to the second embodiment.

Specifically, the display member 110 shown in FIG. 6 includes a base material 112 whose surface is formed with a plurality of pixel regions 114 (#1) and 114 (#2). In FIG. 6, for the sake of clarity, only two pixel regions 114 (#1) and 114 (#2) are illustrated. However, the display member 110 of the present embodiment may include three or more pixel regions 114. In FIG. 6, the two pixel regions 114 (#1) and 114 (#2) are illustrated as having the same size. However, the plurality of pixel regions 114 may have different sizes. There are four alignment marks 113 arrayed on the surface of the base material 112. The pixel regions 114 are arrayed according to the alignment marks 113 such that the x- and y-directions of the pixel regions 114 agree with the x- and y-directions of the base material 112, respectively. As described later, the alignment marks 113 are formed and arrayed at the time when the pixel region 114 is initially formed on the base material 112.

Figure 7A:
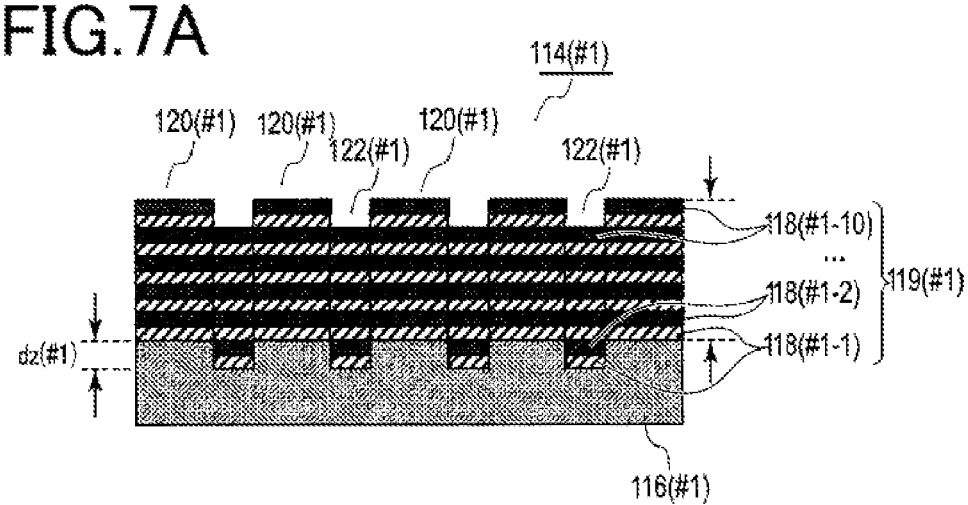
FIG. 7A is a cross-sectional view illustrating a configuration example of a pixel region of the display member produced by the method of production, according to the second embodiment.
Figure 7B:
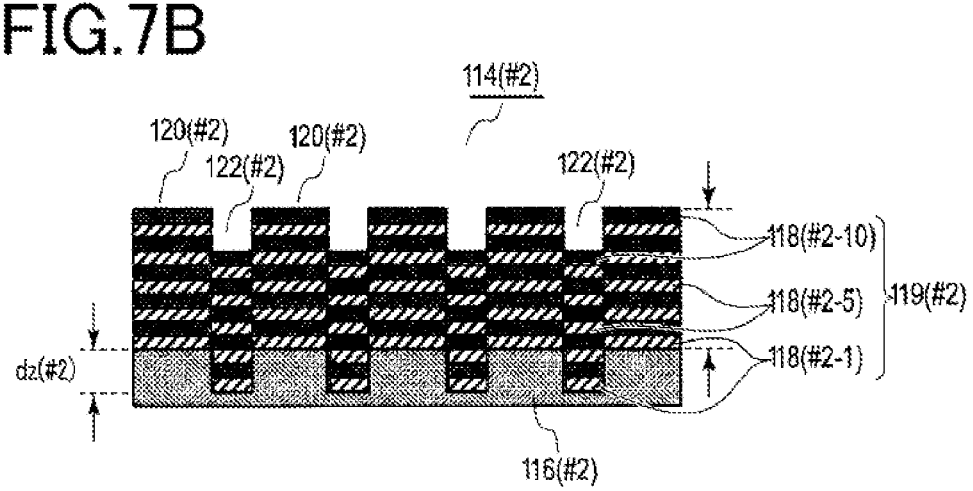
FIG. 7B is a cross-sectional view illustrating a composition example of the pixel region of the display member produced by the method of production, according to the second embodiment.

FIGS. 7A and 7B are cross-sectional views showing configuration examples of the pixel region 114. FIG. 7A is a vertical cross-sectional view in the x-direction of the pixel region 114 (#1) shown in FIG. 6. FIG. 7B is a vertical cross-sectional view in the x-direction of the pixel region 114 (#2) shown in FIG. 6.

Specifically, as shown in FIG. 7A, the pixel region 114 (#1) includes a concavo-convex structure 116 (#1), and a laminated film 119 (#1) laminated on the concavo-convex structure 116 (#1). The laminated film 119 (#1) is made up of a plurality of layers 118 (#1-1) to 118 (#1-10) (ten layers herein as an example). Further, convexities 120 (#1) and concavities 122 (#1) are formed conforming to the unevenness of the concavo-convex structure 116 (#1).

Similarly, as shown in FIG. 7B, the pixel region 114 (#2) includes a concavo-convex structure 116 (#2), and a laminated film 119 (#2) laminated on the concavo-convex structure 116 (#2). The laminated film 119 (#2) is made up of a plurality of layers 118 (#2-1) to 118 (#2-10) (ten layers herein as an example). Similarly, convexities 120 (#2) and concavities 122 (#2) are formed conforming to the unevenness of the concavo-convex structure 116 (#2).

Such a concavo-convex structure 116 is formed, for example, by using a well-known technique, such as lithography using irradiation of light or charged particle beams, or dry etching.

In the display member 110 of the present embodiment, among the plurality of pixel regions 114 formed on the surface of the base material 112, at least two are different in the height of the convexities (hereinafter referred to as "structural height") in the concavo-convex structure 116. Specifically, in the example shown in FIG. 6, and FIGS. 7A and 7B, the pixel regions 114 (#1) and 114 (#2) are different in the structural height dz of the concavo-convex structures 116. More specifically, the structural height dz (#1) of the pixel region 114 (#1) is different from the structural height dz (#2) of the pixel region 114 (#2).

In the method of production according to the present embodiment, lithography using irradiation of light or charged particle beams, or dry etching is performed n times (n=2 in the example of FIG. 6) to thereby form pixel regions 114 (the pixel regions 114 (#1) and 114 (#2) in the example of FIG. 6) in n locations with different structural heights dz in the concavo-convex structures 116.

When using lithography that uses irradiation of charged particle beams, and when the base material 112 is made of an insulating material, such as synthetic quartz, it is preferable that an electrically conductive film made of chromium (Cr) and the like is formed on the base material 112 prior to each lithography process. If the Cr film is formed as an electrically conductive film, Cr needs to be dry-etched before etching the synthetic quartz, using a resist formed in the lithography process as a mask. To form a resist pattern, optical or thermal imprinting may be used.

In the method of production according to the present embodiment, structural heights dz (#1) and dz (#2) of the pixel regions 114 (#1) and 114 (#2), respectively, are controlled by, for example, adjusting the etching time in each dry etching process. The etching time in each dry etching process may be adjusted such that, for example, when the structural height dz (#2) of the pixel region 114 (#2) is larger than the structural height dz (#1) of the pixel region 114 (#1), the etching time of the pixel region 114 (#2) may be made longer than the etching time of the pixel region 114 (#1).

In the case of forming the pixel region 114 (#2) after forming the pixel region 114 (#1), alignment marks 113 are formed on the surface of the base material 112 at the time of forming a resist pattern of the pixel region 114 (#1) thereon. Then, in the lithography process of forming the pixel region 114 (#2), the pixel region 114 (#2) is ensured to be accurately formed at a desired position without overlapping the pixel region 114 (#1), by correcting the position with reference to the coordinates of the alignment marks 113.

The layers 118 (118 (#1-1) to 118 (#1-10) and 118 (#2-1) to 118 (#2-10) have the about same thickness, irrespective of the pixel region 114.

Further, two vertically adjoining layers (for example, layers 118 (#1-1) and 118 (#1-2)) are made of different materials that transmit light of the same wavelength region and have different refractive indices in this wavelength region. The types of materials of the layers 118 and the number of layers 118 may be designed as appropriate depending on desired requirements.

FIGS. 7A and 7B show, as an example, a laminated film including a total of ten layers, that is, alternate lamination of ten layers made of two types of materials. Specifically, of the layers 118, the layers 118 (#1-1), 118 (#1-3), 118 (#1-5), 118 (#1-7), 118 (#1-9), 118 (#2-1), 118 (#2-3), 118 (#2-5), 118 (#2-7), and 118 (#2-9) are made of a first material. Further, the layers 118 (#1-2), 118 (#1-4), 118 (#1-6), 118 (#1-8), 118 (#1-10), 118 (#2-2), 118 (#2-4), 118 (#2-6), 118 (#2-8), and 118 (#2-10) are made of a second material. Further, a third material may be used for the layers 118. Specifically, the number of types of materials for forming the laminated film is not limited to two, as long as the materials have different refractive indices.

The laminated film 119 of the pixel region 114 is laminated through one laminating process under fixed film forming conditions. Therefore, the layers 118 forming the laminated film 119 will have the substantially same thickness under ideal conditions where the layers 118 are impervious to, for example, being deformed. The thickness may be designed to be a desirable thickness using a transfer matrix method or the like.

In the method of production according to the present embodiment, among the layers 118 forming the laminated film 119, the layers 118 (#1-1) and 118 (#2-1) of high refractive index are formed first on the surface of the base material 112. Then, the layers 118 (#1-2) and 118 (#2-2) of low refractive index are formed on the layers 118 (#1-1) and 118 (#2-1) of high refractive index, respectively. Thereafter, the layers of high refractive index and the layers of low refractive index are alternately formed, e.g., layers 118 (#1-3) and 118 (#2-3) of high refractive index, and then, layers 118 (#1-4) and 118 (#2-4) of low refractive index, respectively, and so on. Finally, the layers 118 (#1-10) and 118 (#2-10) of low refractive index are formed at the very top surface. However, the order of laminating layers of high refractive index and layers of low refractive index is not limited to the order mentioned above.

As the difference in refractive index becomes larger between the material of the layers 118 (for example, layer 118 (#1-1)) of high refractive index and the material of the layers 118 (for example, layer 118 (#1-2)) of low refractive index, a higher reflectance can be accomplished with fewer laminated layers.

For example, when using inorganic materials, it is preferable to use titanium dioxide ($TiO_2$) for the layers 118 (for example, layer 118 (#1-1)) of high refractive index, and silicon dioxide ($SiO_2$) for the layers 118 (for example, layer 118 (#1-2)) of low refractive index. However, reflection of light at the interface occurs due to the difference in refractive index of the materials forming the vertically adjoining layers 118 (for example, layers 118 (#1-1) and 118 (#1-2)), and therefore the material combination is not limited to the one mentioned above. As will be described later, organic materials can also be used for the layers 118.

When forming the laminated film 119 (layers 118) with inorganic materials such as those mentioned above, a well-known technique may be used, such as sputtering, atomic layer deposition, or vacuum vapor deposition. When forming the laminated film 119 (layers 118) with organic materials, a well-known technique, such as self-organization, may be used.

Figure 8A:
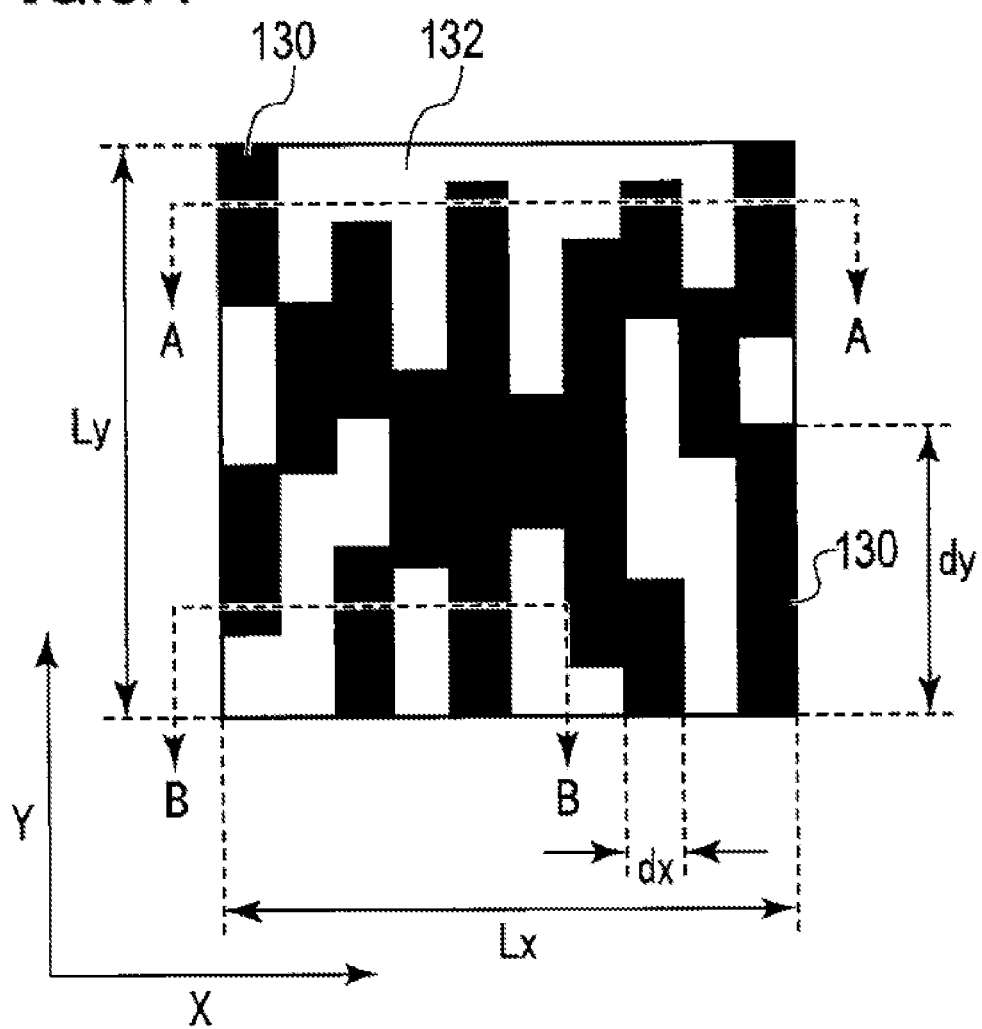
FIG. 8A is an XY plan view illustrating a pixel region.

FIG. 8A shows an example of an XY plan view of the pixel region 114 as seen from above in FIGS. 7A and 7B. This figure corresponds to the planar distribution in the concavo-convex structure 116. In the figure, the regions of rectangles 130 shown in black correspond to the convexities 120, and all other portions 132 shown in white correspond to the concavities 122.

Figure 8B:
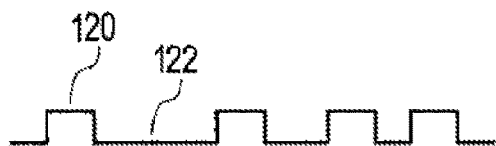
FIG. 8B is a cross-sectional view taken along the Z direction of the pixel region.

FIG. 8B is a cross-sectional view taken along the line A-A of FIG. 8A. The protruded portions are the convexities 120, and the recessed portions are the concavities 122. It should be noted that FIGS. 7A and 7B correspond to specific cross-sectional views taken along the line B-B of FIG. 8A.

As is clear from the above, the two-dimensional distribution of the protrusions and recesses illustrated in FIG. 8A corresponds to the two-dimensional distribution in the concavo-convex structure 116.

Such a two-dimensional distribution is so accomplished that the plurality of rectangles 130 are arrayed without being overlapped with each other on the XY plane. The x- and y-directions of these rectangles 130 agree with the x- and y-directions of the pixel region 114. In each pixel region 114, the plurality of rectangles 130 have a given length dx in the x-direction.

In each pixel region 114, the plurality of rectangles 130 each have a length dy in the y-direction which is not less than the length dx of the plurality of rectangles 130 in the x-direction, and not more than a length Ly of the pixel region 114 in the y-direction.

In each pixel region 114, the length dy of the plurality of rectangles 130 in the y-direction conforms to a normal distribution.

In each pixel region 114, whether the rectangles 130 are arrayed or not is determined according to a fixed probability. Alternatively, in each pixel region 114, the array of the rectangles 130 may be determined such that the ratio of the area for arraying the rectangles 130, to the area not containing the rectangles 130 takes a predetermined value. FIG. 8A shows an example where the ratio of the area for arraying the rectangles 130, to the area not containing the rectangles 130 is 1:1. Specifically, in the example of FIG. 8A, the total area of regions occupied by the black rectangles 130 is equal to the total area of other white portions 132.

In the display member 110 configured in this way, the wavelength region of the light used as incident light is not particularly limited. The following description is provided by way of an example of using a visible light wavelength region as incident light. The visible light wavelength region as mentioned in the present invention refers to a wavelength band of 360 nm to 830 nm.

Specifically, when visible light is used as incident light, the materials forming the display member 110 that is produced by the method of production of the present embodiment all transmit light in the visible light wavelength region. For example, the base material 112 may be made of a material transmitting light in the visible light wavelength region as synthetic quartz does. Further, for example, titanium dioxide ($TiO_2$) may be applied to the layers 118 (for example, the layer 118 (#1-1)) of high refractive index, and silicon dioxide ($SiO_2$) to the layers 118 (for example, the layer 118 (#1-2)) of low refractive index, in the laminated film 119. Other examples of the material having high transmissivity with respect to the visible light wavelength region include inorganic dielectric materials, such as $Nb_2O_5$, $Ta_2O_5$, $Al_2O_3$, $Fe_2O_3$, $HfO_2$, $MgO$, $ZrO$, $SnO_2$, $Sb_2O_3$, $CeO_3$, $WO_3$, $PbO$, $In_2O_3$, $CdO$, $BaTiO_3$, $ITO$, $LiF$, $BaF_2$, $CaF_2$, $MgF_2$, $AlF_3$, $CeF_3$, $ZnS$, and $PbCl_2$; and organic resin materials, such as an acrylic resin, a phenolic resin, and an epoxy resin. These materials may be used as appropriate.

In this way, the display member 110 produced by the method of production according to the present embodiment transmits all types of light in the visible light wavelength region. Therefore, when using color development ascribed to reflection in the display member 110, the base material 112 or the rear surface thereof is preferably formed of a material absorbing light in the visible light wavelength region. Alternatively, a light absorbent may be applied onto the front surface of the base material 112 to obtain color development ascribed to reflection from the rear surface.

The size of the pixel region 114 may be determined based on the resolution of the image to be displayed. In order to display a higher precision image, each side of the pixel region 114 is preferably 10 μm or more. Specifically, it is preferable that the length Lx in the x-direction and the length Ly in the y-direction are 10 μm or more in the pixel region 114 shown in FIG. 8A.

To develop a sharper color in the pixel region 114, the light diffusion effect exerted by the concavo-convex structure 116 is preferably made larger. To accomplish this, the concavo-convex structure 116 in the pixel region 114 preferably has the area ratio of 1:1, as an example, between the concavities and the convexities as mentioned above.

Further, to more enhance the light dispersion effect of the display member in the pixel region 114, the length dx of the rectangles 130 in the x-direction in FIG. 8A needs to be adjusted for each desired color. For example, when using visible light as incident light, it is preferable that the length dx of each rectangle 130 in the x-direction is 700 nm or less. When using the pixel region 114 as a blue pixel among various colors of visible light, the length dx of each rectangle 130 in the x-direction is preferably in the order of 300 nm. However, even if the length dx is not adjusted for each color, the light dispersion effect of the display member can be exerted.

The structural height dz in the pixel region 114 is determined, depending on the desired color. Specifically, the optimal values of the structural height dz (#1) of the concavo-convex structure 116 (#1) and the structural height dz (#2) of the concavo-convex structure 116 (#2) shown in FIGS. 7A and 7B, respectively, are determined based on the wavelength of light which is color-developed in the pixel regions 114 (#1) and 114 (#2), taking account of the length dx of the rectangles 130 in the x-direction shown in FIG. 8A.

Let us take an example, herein, where the wavelength of reflection in the laminated film 119 is 500 nm. In this case, when green is desired to be produced, the length dx of each rectangle 130 in the x-direction is preferably in the order of 400 nm, and the structural heights dz (#1) and dz (#2) are each preferably in the order of 100 nm. Also, when red is desired to be produced, the length dx of each rectangle 130 in the x-direction is preferably in the order of 460 nm, and the structural heights dz (#1) and dz (#2) are each preferably in the order of 200 nm.

The pixel regions 114 (#1) and 114 (#2) are designed to develop different colors by setting the structural heights dz to different values. Specifically, as the difference becomes larger between the structural height dz (#1) of the pixel region 114 (#1) and the structural height dz (#2) of the pixel region 114 (#2), the difference in color becomes more prominent, and the difference in color comes to be perceptible even to the human eye. In this regard, as an example, the difference between the structural height dz (#1) of the pixel region 114 (#1) and the structural height dz (#2) of the pixel region 114 (#2) is designed to be 5 nm or more. When the wavelength of reflection in the laminated film 119 is 500 nm, 5 nm corresponds to 1% thereof. In this way, it is preferable that the difference between the structural height dz (#1) of the pixel region 114 (#1) and the structural height dz (#2) of the pixel region 114 (#2) is 1% or more of the wavelength of light reflected by the laminated film 119.

In this way, the wavelength band of light to be used is used as a basis for determining the length Lx in the x-direction and the length Ly in the y-direction of each side of the pixel region 114, the difference in the structural height dz between the plurality of pixel regions 114, and the length dx of each rectangle 130 in the x-direction.

As described above, according to the method of production of the present embodiment, a display member 110 capable of expressing hues with a single multi-layer laminated film can be produced through a simple production process without having to perform a complicated production process.

In particular, since a uniform laminated film 119 including a plurality of (for example, ten) layers 118 is formed on all the pixel regions 114 (for example, pixel regions 114 (#1) and 114 (#2)), masking and lamination do not have to be repeated by the number of times corresponding to the desired number of colors. Thus the display member 110 expressing multi-colors can be produced through a single laminating process.

In this way, the simplified production process can curb the reduction of productivity of the display member 110.

With the display member 110 produced through such a method of production, physical thickness of the laminated film 119 becomes uniform between different pixel regions 114 (for example, pixel regions 114 (#1) and 114 (#2)), and therefore color mixing between adjoining pixel regions (for example, pixel regions 114 (#1) and 114 (#2)) will not occur. Further, the color for each pixel region 114 can be easily controlled by adjusting the structural height dz and the length dx in the x-direction of the pixel region 114. Accordingly, the fine pixel regions 114 can be sharply expressed, and thus high designability is accomplished.

Figure 9:
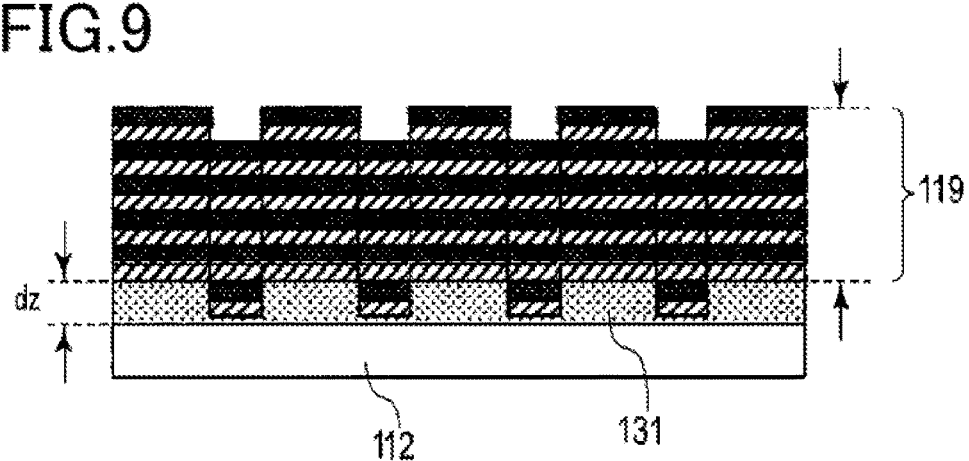
FIG. 9 is a cross-sectional view illustrating a configuration example of a pixel region of a display member produced by a method of production of another example, according to the second embodiment.

Referring to FIG. 9, another example of the second embodiment of the present invention will be described.

FIG. 9 is a cross-sectional view illustrating a configuration example of a pixel region of a display member produced through a method of production according to another example of the second embodiment. This configuration corresponds to the one shown in FIG. 7 referred to in the second embodiment.

In FIG. 9, like reference signs are assigned to like portions described in the second embodiment to avoid duplicate description. The following description is focused on differences from the second embodiment.

Specifically, as shown in the cross-sectional view of FIG. 9, the display member produced by the method of production according to another example of the second embodiment is different from the display member of the second embodiment in that a concavo-convex structure is formed in a resin layer 131 formed between the laminated film 119 and the base material 112.

The resin layer 131 is made of a photo-curable resin which is applied onto the surface of the base material 112 when, for example, forming the concavo-convex structure 116 through optical nanoimprinting.

In the method of production according to another example of the second embodiment, the concavo-convex structure 116 is formed on the photo-curable resin 131. In this case, it is necessary to prepare a photo imprinting mold which is designed to have desired structural heights dz for respective pixel regions 114.

To prepare an imprinting mold with different structural heights dz for respective pixel regions 114, lithography and dry etching may be repeated, as described in the second embodiment, every time a pixel region 114 is formed. Alternatively, an imprinting mold can be prepared more simply. To this end, for example, a method of preparing an imprinting mold made of Ni may be used. In this method, the dose of charged particle beams irradiated to a resist in charged particle beam lithography is changed for each pixel region 114, and the developing time is adjusted such that a desired structural height dz is obtained in each pixel region 114, followed by forming a metal film such as of Ni on the formed resist pattern, which is further followed by electroforming to dissolve the resist, thereby obtaining the Ni imprinting mold.

With this method of production as well, the display member 110 described in the second embodiment can be produced.

According to the display member and the method of producing the same of the second embodiment, multi-hued color can be provided through a simple process. Further, according to the method of production of the second embodiment, a uniform laminated film is formed on all the pixel regions, and therefore masking and lamination need not be performed a number of times corresponding to the desired number of colors. Thus, a display member expressing multi-colors can be produced through a single laminating process. In this way, the simplified production process can curb the reduction of productivity of the display member. Further, according to the display member of the second embodiment produced through this method of production, the laminated film will have a uniform physical thickness between different pixel regions, and therefore color mixing between adjoining pixel regions does not occur. Accordingly, the fine pixel regions can be sharply expressed, and thus high designability is accomplished.

The second embodiment has been described by way of an example of the configuration of a display member where a plurality of pixel regions each include a concavo-convex structure and a laminated film laminated on the concavo-convex structure. However, the configuration is not limited to this. For example, it may be so configured that a color developing structure made up of a concavo-convex structure and a laminated film laminated on the concavo-convex structure is formed in a plurality of pixel regions.

EXAMPLES

Example 1

Referring to the drawings, the following description addresses Example 1 for preparing the color developing structure according to the first embodiment.

Figure 10A:
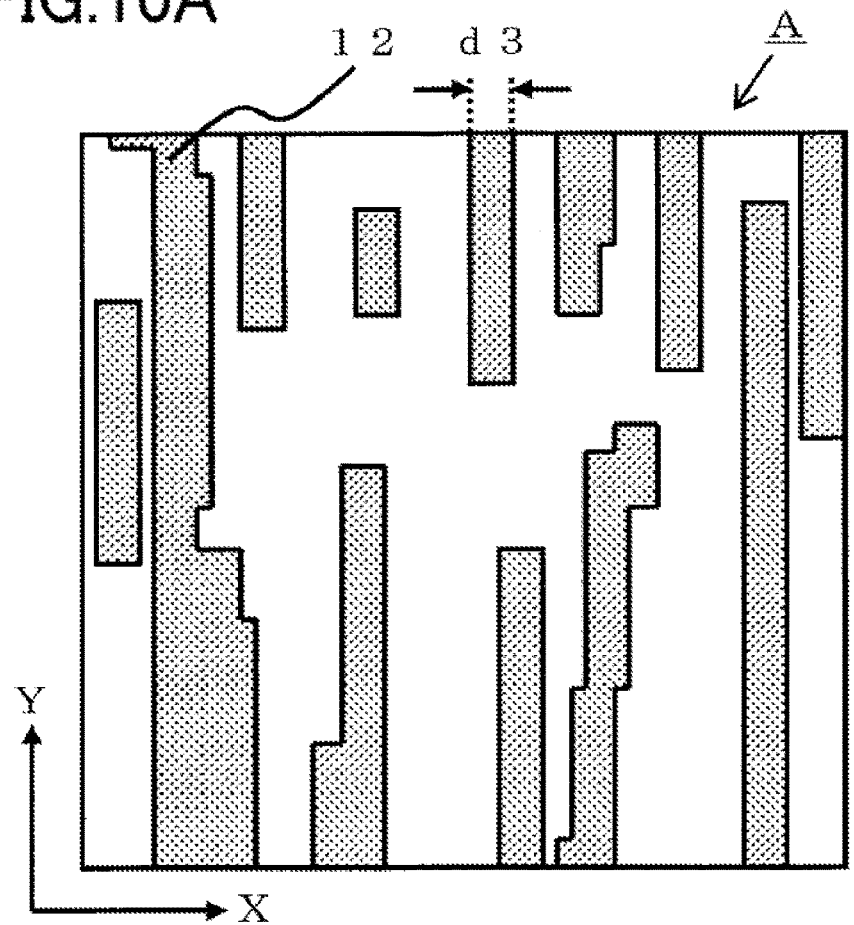
FIG. 10A is a schematic view illustrating a concavo-convex structure provided to a color developing structure, according to Example 1.
Figure 10B:
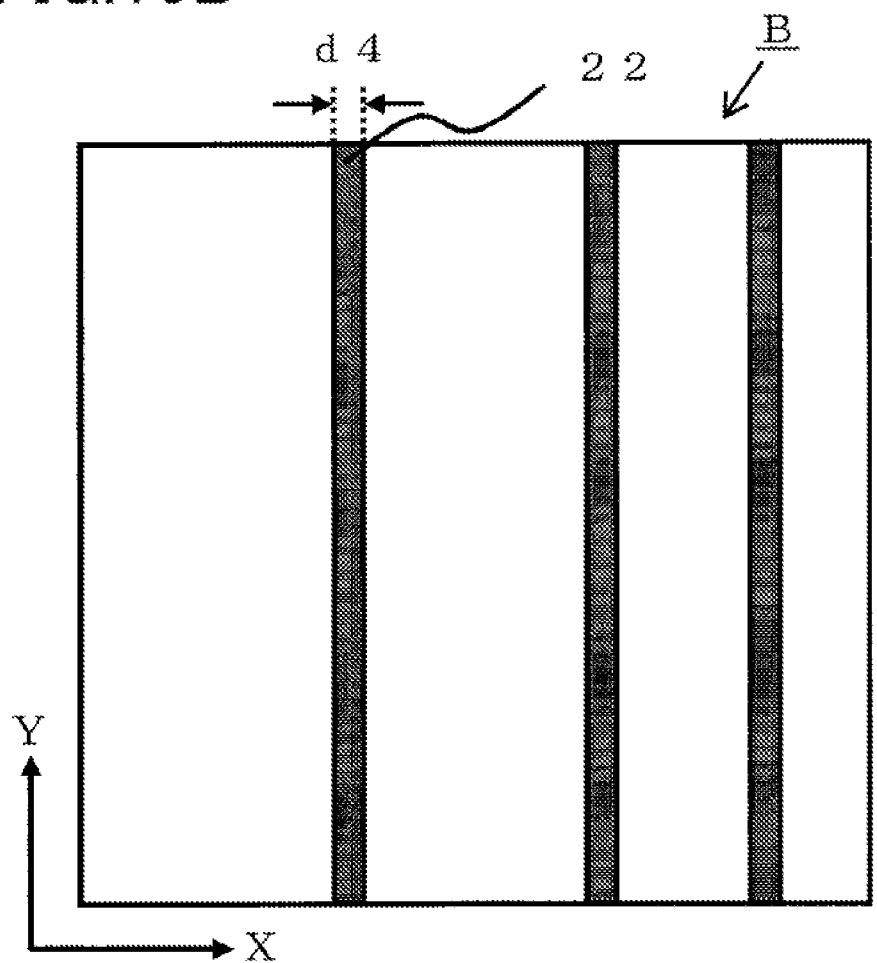
FIG. 10B is a schematic view illustrating the concavo-convex structure provided to the color developing structure, according to Example 1.
Figure 10C:
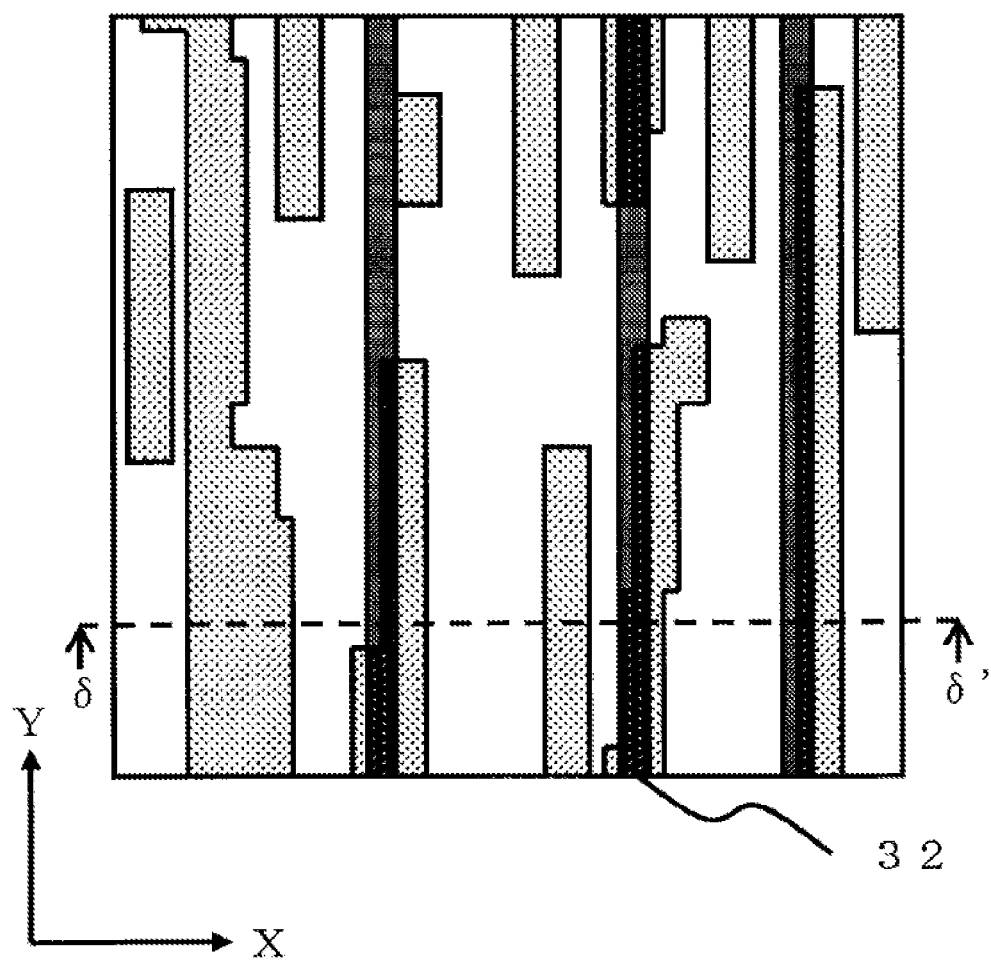
FIG. 10C is a schematic view illustrating the concavo-convex structure provided to the color developing structure, according to Example 1.
Figure 10D:
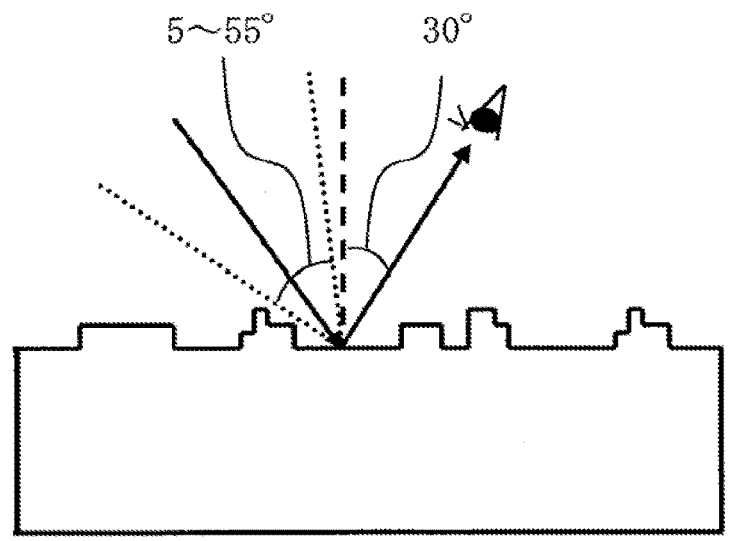
FIG. 10D is a schematic view illustrating the concavo-convex structure provided to the color developing structure, according to Example 1.

FIGS. 10A to 10D are schematic diagrams each illustrating a concavo-convex structure provided to the color developing structure of Example 1. FIG. 10A is a schematic plan view illustrating part of a region of the concavo-convex structure A for inducing the light dispersion effect. FIG. 10B is a schematic plan view illustrating part of a region of the concavo-convex structure B formed of linear structures for inducing a diffraction phenomenon. FIG. 10C is a schematic plan view illustrating a concavo-convex structure where the concavo-convex structure A shown in FIG. 10A and the concavo-convex structure B shown in FIG. 10B are overlapped with each other. Further, FIG. 10D is a schematic cross-sectional view taken along the line δ-δ' of FIG. 10C. The schematic plan views of FIGS. 10A, 10B, and 10C each illustrate an enlarged microscopic region of about 5.6 μm on each side, on the surface of the color developing structure. The color developing structure was prepared through optical nanoimprinting. However, a thermal nanoimprint method may be used for the preparation.

Convexities 12 shown in FIG. 10A are made up of rectangles each having a line width d3 of 300 nm in the x-direction and a line length selected from integral multiples of not less than twice of d3 in the y-direction, with the average being 2.4 μm and standard deviation being 0.5 μm. The rectangles were so designed as to be arrayed in the x- and y-directions, at a pitch of 100 nm in the x-direction, allowing the rectangles to be overlapped with each other in the x-direction, but not allowing them to be overlapped with each other in the y-direction. Regions where the rectangles were overlapped with each other in the x-direction to form a plurality of layered structures were approximated to a single-layer structure.

Linear structures 22 shown in FIG. 10B include rectangles each having a line width d4 of 200 nm in the x-direction and a line length of 94 μm in the y-direction. These rectangles were arrayed at an average pitch of 1.5 μm in the x-direction and a standard deviation of 0.5 μm, in a rectangular region having a length of 40 μm in the x-direction and a length of 94 μm in the y-direction. Such linear structures were so designed as to be arrayed at an average pitch of 45 μm in the x-direction and a standard deviation of 1 μm, and at an average pitch of 97 μm in the y-direction and a standard deviation of 1 μm. Regions where the rectangles were overlapped with each other in the x-direction or the y-direction to form a plurality of layered structures were approximated to a single-layer structure.

First, an optical nanoimprinting mold was prepared. Specifically, since the wavelength of the light irradiated during optical nanoimprinting was 365 nm, synthetic quartz that transmits light of this wavelength was used as a material for the mold. A film of Cr was formed by sputtering on a surface of a synthetic quartz base plate, followed by electron beam lithography to thereby form an electron beam resist pattern. The electron beam resist used was of a positive type, and had a thickness of 200 nm. Electron beam irradiating regions were the regions corresponding to the rectangular structures 12 shown in FIG. 10A. High frequency waves were applied to a mixed gas of chlorine and oxygen, and the generated plasma was used for etching to remove Cr in the regions where the surfaces were exposed. Then, high frequency waves were applied to a hexafluoroethane gas, and the generated plasma was used for etching quartz in the regions where the surfaces were exposed. The depth of the quartz resulting from the etching was 70 nm. The residual resist and the Cr film were removed, thereby obtaining a synthetic quartz base plate where concavities for forming the convexities 12 shown in FIG. 10A were formed.

Then, a film of Cr was formed by sputtering on the surface of the synthetic quartz base plate where concavities for forming the convexities 12 were formed, followed by electron beam lithography to form an electron beam resist pattern. The electron beam resist used was of a positive type, and had a thickness of 200 nm. Electron beam irradiating regions were the regions corresponding to the linear structures 22 shown in FIG. 10B. High frequency waves were applied to a mixed gas of chlorine and oxygen, and the generated plasma was used for etching to remove Cr in the regions where the surfaces were exposed. Then, high frequency waves were applied to a hexafluoroethane gas, and the generated plasma was used for etching quartz in the regions where the surfaces were exposed. The depth of the quartz resulting from the etching was 65 nm. The residual resist and Cr film were removed, thereby obtaining a synthetic quartz base plate formed with concavities for forming the concavo-convex structure shown in FIG. 10C where the convexities 12 were overlapped with the linear structures 22.

Then, OPTOOL HD-1100 (product of Daikin Industries, Ltd.) was applied, as a mold release agent, onto the surface of the synthetic quartz base plate, thereby obtaining an optical nanoimprinting mold, the mold being formed with concavities for forming a concavo-convex structure where the concavo-convex structure for inducing the light dispersion effect was overlapped with the concavo-convex structure formed of the linear structures for inducing a diffraction phenomenon.

Then, photo-curable resin PAK-02 (product of Toyo Gosei Co., Ltd.) was applied onto an easily adherent surface of a polyester film COSMOSHINE A4100 (product of Toyobo Co., Ltd.), the surface being applied with easy adhesion treatment. Then, the optical nanoimprinting mold was pressed against the resin-applied surface of the polyester film, followed by irradiating light of 365 nm from the rear surface of the mold to cure the photo-curable resin. Then, the polyester film was peeled off from the mold to thereby obtain a polyester film formed with the concavo-convex structure shown in FIG. 10C.

Then, the surface of the obtained polyester film was subjected to vacuum vapor deposition to form a laminate of ten layers in which a $TiO_2$ layer with a thickness of 40 nm and a $SiO_2$ layer with a thickness of 75 nm were alternately laminated in this order five times, thereby obtaining a color developing structure of Example 1.

Comparative Example 1

Similarly to Example 1, the concavities for forming the convexities 12 shown in FIG. 10A were formed in a synthetic quartz base plate, followed by applying a mold release agent, without forming and overlapping the concavities for forming the linear structures 22 shown in FIG. 10B, thereby obtaining an optical nanoimprinting mold of Comparative Example 1. Similarly to Example 1, a color developing structure of Comparative Example 1 was obtained using the optical nanoimprinting mold.

Then, as shown in the schematic diagram of FIG. 10D, the surfaces of the color developing structures of Example 1 and Comparative Example 1 were irradiated with light emitted from a xenon lamp light source at incident angles of 5, 15, 25, 35, 45 and 55 degrees, followed by measuring spectral characteristic changes at a reflection angle of 30 degrees, using a spectroradiometer SR-UL2 (product of Topcon Co., Ltd.). The incident angle or the reflection angle refers to an angle between a line normal to the surface of the polyester film and the incidence direction or the reflection direction of the light source, respectively.

[Measurements]

Figure 11A:
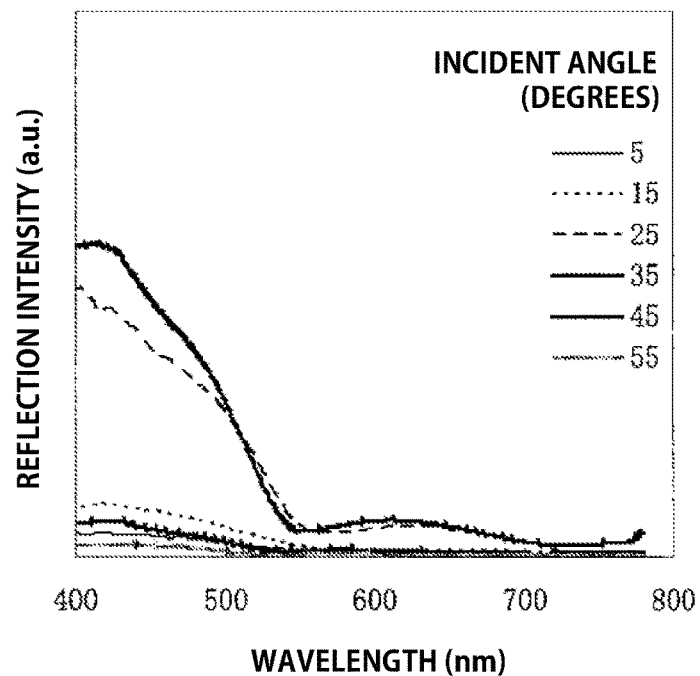
FIG. 11A is a diagram illustrating measurements of a reflection spectrum of a color developing structure of Comparative Example 1.
Figure 11B:
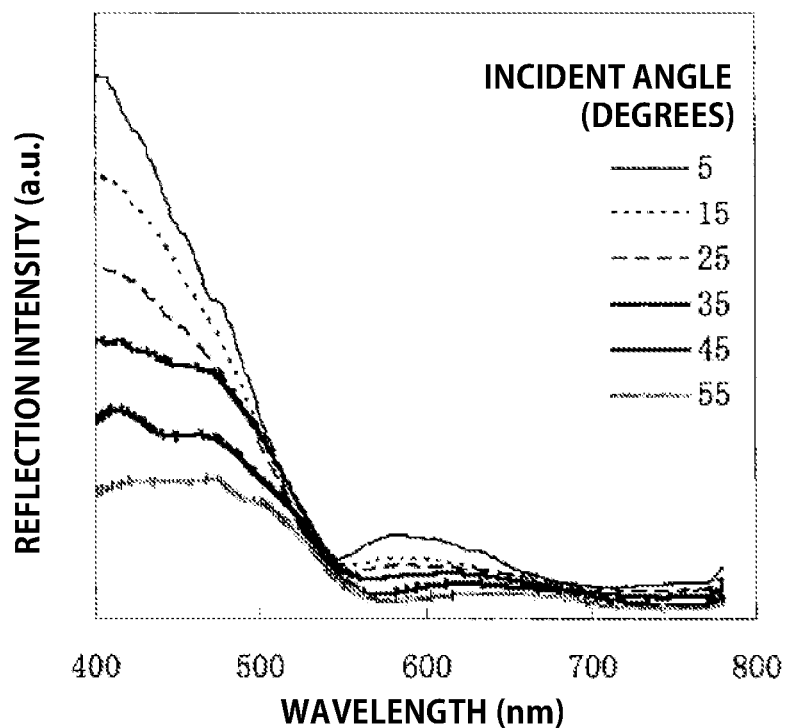
FIG. 11B is a diagram illustrating measurements of a reflection spectrum of the color developing structure, according to Example 1.

FIG. 11A shows measurements of a reflection spectrum of the color developing structure of Comparative Example 1, and FIG. 11B shows measurements of a reflection spectrum of the color developing structure of Example 1. The value range ranges on the vertical axis are the same between these spectra. Comparisons between these spectra showed that, formation of the linear structures for inducing a diffraction phenomenon can accomplish relatively intense reflection in a broad incident angle range with no great change in the peak positions of the spectra.

Example 2

The following description addresses, as Example 2, characteristics of the method of production described in the second example, and the display member (color developing structure) produced by the method.

The display member 110 will be described as a specific example. The display member 110 is configured by forming the pixel regions 114 by providing fine concavo-convex structures by dry etching on a surface of a synthetic quartz wafer, and performing vacuum vapor deposition to thereby deposit the laminated film 119 including $TiO_2$ layers that is the layers 118 of high refractive index and $SiO_2$ layers that is the layers 118 of low refractive index.

First, an optical nanoimprinting mold was prepared. Since the wavelength of light irradiated in optical nanoimprinting is 365 nm, synthetic quartz that transmits light of this wavelength was used as a material for the mold. Further, a film of chromium (Cr) was formed by sputtering on a surface of the synthetic quartz, followed by electron beam lithography to thereby form an electron beam resist pattern.

The formed pattern had a concavo-convex structure that was an inversion of the concavo-convex structure having a two-dimensional distribution as illustrated in FIG. 8A, with a single pixel being in a square shape having a side length of 170 mm. The length dx in the x-direction shown in FIG. 8A was 460 nm, and the length dy in the y-direction was selected from a normal distribution where an average was 2400 nm and a standard deviation was 580 nm. A plurality of rectangles having a length dx in the x-direction and a length dy in the y-direction were arrayed such that the rectangles were not overlapped with each other in the x-direction.

Then, alignment marks as references for positioning were formed on the mold. The electron beam resist used was of a positive type, and had a thickness of 200 nm. Further, high frequency waves were applied to a mixed gas of chlorine (Cl2) and oxygen (O2), and the generated plasma was used for etching to remove Cr in the regions where the surfaces were exposed.

Then, high frequency waves were applied to a hexafluoroethane gas, and the generated plasma was used for etching quartz in the regions where the surfaces were exposed. The depth of the quartz resulting from the etching was 70 nm.

Then, residual resist and the Cr film were removed, thereby obtaining an optical nanoimprinting mold made of synthetic quartz in which a pixel region configured by a concavo-convex structure was formed. Then, OPTOOL HD-1100 (product of Daikin Industries, Ltd.) was applied, as a mold release agent, onto the surface of the optical nanoimprinting mold.

Then, a synthetic quartz wafer was prepared. The synthetic quartz wafer was used as a base material 112 as illustrated in FIG. 6. A photo-curable resin was applied onto a surface of the synthetic quartz wafer. Then, the optical nanoimprinting mold was pressed against the resin-applied surface of the wafer, followed by irradiating light of 365 nm from the rear surface of the mold to cure the photo-curable resin. Then, the synthetic quartz wafer was peeled off from the mold. Thus, a synthetic quartz wafer was obtained, in which a concavo-convex structure having a two-dimensional distribution as illustrated in FIG. 8A was formed in the photo-curable resin.

The synthetic quartz wafer was subjected to plasma etching using O2 gas to remove the photo-curable resin remaining in the concavities of the concavo-convex structure. Further, 40 (sccm) of O2 gas was introduced and plasma was discharged. It should be noted that 1 (sccm) is equivalent to 1 (ml/min).

Then, plasma etching was performed using a mixed gas of octafluorocyclobutane (C4F8) and argon (Ar) for the transfer of the concavo-convex structure. 40 sccm of C4F8 and 60 sccm of Ar were introduced, and after setting the pressure in a plasma chamber to 5 mTorr, plasma was discharged with an application of 75 W of RIE power and 400 W of ICP power. The structural height dz was adjusted by changing the etching time. The structural height dz of the concavo-convex structure in the pixel region 114 was set to 80 nm.

It should be noted that 1 (Torr) is equivalent to 1 (mmHg). Namely, 1 (Torr) is equivalent to about 133.322 (Pa).

Then, organic cleaning was performed using ST-105 (solution of dimethyl sulfoxide and monoethanolamine mixed at a ratio of 7:3, product of Kanto Chemical Co., Inc.) and acid cleaning was performed using SH-303 (solution of sulfuric acid and hydrogen peroxide solution mixed as basic components, product of Kanto Chemical Co., Inc.), thereby obtaining a pixel region 114 having a concavo-convex structure 116 with the structural height dz.

Then, a photo-curable resin was again applied onto the surface of the synthetic quartz wafer. Then, the optical nanoimprinting mold was pressed against the resin-applied surface of the wafer, being displaced, so that the mold would not overlap the already formed pixel region 114 (for example, pixel region 114 (#1)), followed by irradiating light of 365 nm from the rear surface of the mold to cure the photo-curable resin. Then, the synthetic quartz was peeled off from the mold to thereby form the concavo-convex structure 116 (#2) of the next pixel region 114 (for example, pixel region 114 (#2)) in the photo-curable resin. Positioning was performed using the alignment marks 113 formed on the synthetic quartz wafer, and the pixel region 114 (#2) was formed at a position not overlapping the first formed pixel region 114 (#1).

Then, the synthetic quartz wafer was subjected to plasma etching using O2 gas to remove the photo-curable resin remaining in the concavities of the concavo-convex structure. Further, 40 sccm of O2 was introduced and plasma was discharged.

Then, plasma etching was performed using a mixed gas of C4F8 and Ar for the transfer of the concavo-convex structure 116. 40 sccm of C4F8 and 60 sccm of Ar were introduced, and after setting the pressure in a plasma chamber to 5 mTorr, plasma was discharged with an application of 75 W of RIE power and 400 W of ICP power. The structural height dz was adjusted, by changing the etching time, to 230 nm.

Then, acid cleaning was performed using SH-303, that is, organic cleaning was performed using ST-105, thereby forming a pixel region 14 (#1) having a concavo-convex structure 116 with the structural height dz. Then, the surface of the synthetic quartz wafer was subjected to vacuum vapor deposition to form a laminated film 119 of ten layers in which a $TiO_2$ layer 118 with a thickness of 205 nm and a $SiO_2$ layer 118 with a thickness of 100 nm were alternately laminated five times, thereby obtaining a display member 110 including the pixel regions 114 (#1 and #2) in each of which the laminated film 119 was formed on the concavo-convex structure 116.

Figure 12:
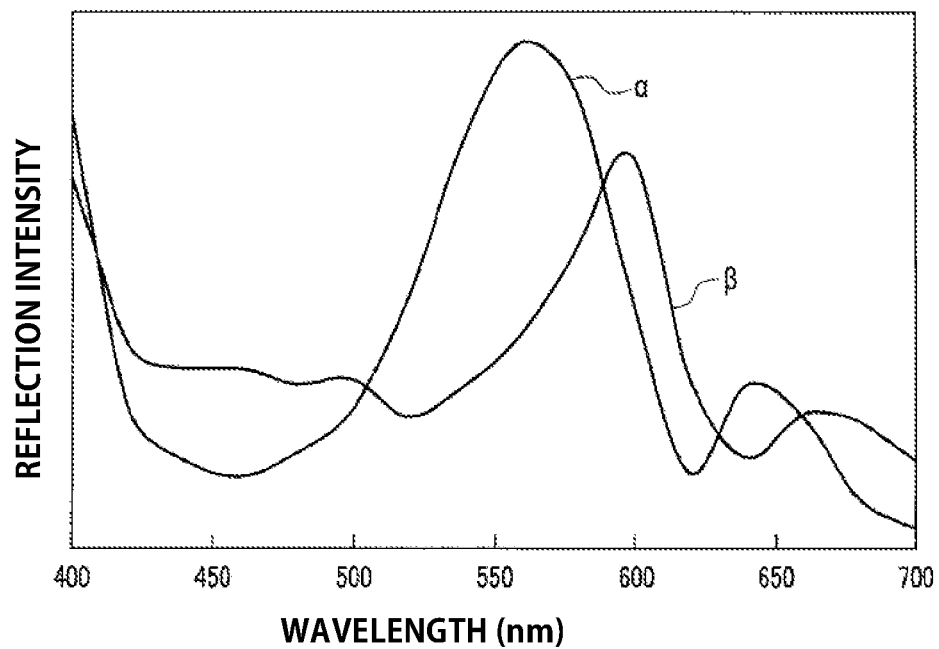
FIG. 12 is a diagram illustrating an example of a relationship between wavelength and reflection intensity in a display member produced by the method of production, according to the second embodiment.

FIG. 12 shows a relationship between wavelength and reflection intensity observed at 0° in the x-direction in the case where light is incident at an angle of 30° with respect to the pixel regions 114 (#1 and #2) of the display member 110.

Specifically, in the case of structural height dz=80 nm, green light having a wavelength of 560 nm was reflected with glossiness as shown by the curve α, and in the case of structural height dz=230 nm, orange light having a wavelength of 600 nm was reflected as shown by the curve β.

As described in the above examples, to produce the display member 110, an imprinting mold is prepared first, whose surface is formed with an array of a plurality of regions having respective concavo-convex structures. Each concavo-convex structure has a structure, as shown in FIG. 8A, that is an inversion of the concavo-convex structure 116 of each pixel region 114 of the display member 110.

Then, the plurality of regions formed in the mold is sequentially transferred to the base material 112 through optical or thermal imprinting. Thus, a desired concavo-convex structure 116, such as the one shown in FIG. 8A, is transferred onto the base material 112.

Then, a plurality of layers 118 are laminated on each concavo-convex structure 116 transferred to the base material 112 to form the laminated film 119. Consequently, a display member 110 is produced with the pixel regions 114 being formed therein.

As described above referring to FIG. 12, the display member 110 produced in this way exhibited that the color of reflection can be controlled by adjusting the structural height dz.

INDUSTRIAL APPLICABILITY

The color developing structure of the present invention can be applied to display bodies with higher designability. In particular, the color developing structure of the present invention is expected to be preferably used in the field of surface decoration.

REFERENCE SIGNS LIST

A . . . Uneven structure for inducing light dispersion effect; B . . . Uneven structure formed of linear structures for inducing diffraction phenomenon; 31 . . . Overlapped portion; 41 . . . High refractive index layer; 51 . . . Low refractive index layer; 61 . . . Laminated film; 71 . . . Absorption layer; 81, 131 . . . Photosetting resin; 101, 102, and 103 . . . Base material; 110 . . . display member; 112 . . . Base material; 113 . . . Alignment mark; 114 . . . Pixel region; 116 . . . Uneven structure; 118 . . . Layer; 119 . . . Laminated film; 120 . . . Convexity; 122 . . . Concavity; 130 . . . Rectangle

What is claimed is:

1. A color developing structure formed on a surface of a base material, wherein:

the color developing structure has a rectangular shape in plan view, and is formed of a concavo-convex structure having a plurality of convexities with different heights and a laminated film including a plurality of layers laminated on the concavo-convex structure;

the plurality of layers, adjoining in a lamination direction are made of materials that transmit light of the same wavelength band and have different refractive indices with respect to light of the wavelength band; and a total layer thickness of the plurality of layers on the plurality of convexities and on the plurality of concavities is about the same;

wherein:

the concavo-convex structure includes a concavo-convex structure A and a concavo-convex structure B overlapped with each other to form a multilevel structure of at least two levels or more;

the concavo-convex structure A has flat convexities configured by arraying rectangles in a first direction and a second direction, each rectangle having a line width in the first direction, the line width being not more than a minimum wavelength of the wavelength band, and a line length in the second direction, the line length being perpendicular to the first direction and greater than the line width in the first direction, the line length in the second direction having a standard deviation of greater than a standard deviation of the line width in the first direction;

the concavo-convex structure B includes a plurality of protruding strips extending in the second direction and arrayed in the first direction at pitches of not less than a half of the minimum wavelength of the wavelength band;

wherein the concavo-convex structure B has periodicity in both the first direction and the second direction; and at least one of an average and a standard deviation of pitches of the protruding strips forming the concavo-convex structure B is different between the first direction and the second direction.

2. The color developing structure of claim 1, wherein:
the concavo-convex structure B includes a plurality of overlapped periodic structures each having different periodicity; and
the periodic structures forming the concavo-convex structure B have an average pitch that is not less than a half of the minimum wavelength of the wavelength band.

3. The color developing structure of claim 1, wherein:
the line width in the first direction is 830 nm or less; and
the pitches in the first direction in the concavo-convex structure B are 180 nm or more.

4. The color developing structure of claim 3, wherein the protruding strips forming the concavo-convex structure B have an average pitch of 1 μm or more and 100 μm or less in the first direction and in the second direction.

5. The color developing structure of claim 1, wherein:
the concavo-convex structure has the flat convexities configured by arraying rectangles in the first direction and in the second direction perpendicular to the first direction;
the concavo-convex structure and the laminated film are formed in each of a plurality of pixel regions provided on a surface of the base material;
in each pixel region, the convexities have the same height; and
at least two pixel regions are so formed that the convexities are different in height between the two regions.

6. The color developing structure of claim 5, wherein:
the first direction and the second direction of the pixel regions agree with the first direction and the second direction of the rectangles, respectively, and
in each pixel region, the rectangles have a given length in the first direction.

7. The color developing structure of claim 6, wherein, in each pixel region, each of the rectangles has a length in the second direction of not less than the length of the rectangle in the first direction and not more than the length of the pixel region in the second direction.

8. The color developing structure of claim 7, wherein, in each pixel region, each of the rectangles has a length in the second direction, conforming to a normal distribution.

9. The color developing structure of claim 5, wherein, in each pixel region, a ratio of an area where the rectangles are arrayed, to an area where the rectangles are not arrayed is 1:1.

10. The color developing structure of claim 5, wherein the wavelength band is a visible region, and each of the rectangles has a length of 700 nm or less in the first direction.

11. The color developing structure of claim 5, wherein a group of pixel regions is provided, the pixel regions being different from each other in height of the convexities by 5 nm or more.

12. The color developing structure of claim 5, wherein all the plurality of pixel regions have sides with a length of 10 μm or more.

13. The color developing structure of claim 1, wherein:
an absorption layer absorbing light in the visible region is formed on a surface of the base material on a side opposite of a surface on which the concavo-convex structure is formed, or is formed between the concavo-convex structure and the surface of the base material; or
the base material is made of a material absorbing light in the visible region.

14. The method of producing a color developing structure of claim 13, wherein:
the first concavities in the first direction each have a line width of 830 nm or less, and the second concavities in the first direction are arrayed at pitches of 180 nm or more.

15. A method of producing a color developing structure including a base material, a concavo-convex structure formed in a surface of the base material or on the base material, and a laminated film laminated on the concavo-convex structure, the method comprising:
a step of preparing an imprinting mold having a predetermined structure formed on a surface of the mold;
a step of forming the concavo-convex structure by transferring the structure formed on the mold to the base material by photo imprinting or thermal imprinting; and
a step of forming the laminated film on the concavo-convex structure transferred to the base material by laminating materials that transmit light of the same wavelength band and have different refractive indices with respect to light of the wavelength band, wherein:
the laminated film is formed of a plurality of layers and a total thickness of the plurality of layers on the plurality of convexities and on the plurality of concavities is about the same;
wherein:
the step of preparing the mold includes:
forming a concavo-convex structure A having first flat concavities configured by arraying rectangles in a first direction and a second direction, each rectangle having a line width in the first direction, the line width being not more than a minimum wavelength of the wavelength band, and a line length in the second direction, the line length being perpendicular to the first direction and greater than the line width in the first direction, the line length in the second direction having a standard deviation of greater than a standard deviation of the line width in the first direction;
forming a concavo-convex structure B having a plurality of second linear concavities extending in the second direction and arrayed at pitches of not less than a half of the minimum wavelength of the wavelength band; and
overlapping the first flat concavities with the second linear concavities; wherein the concavo-convex structure B has periodicity in both the first direction and the second direction; and
at least one of an average and a standard deviation of pitches of the protruding strips forming the concavo-convex structure B is different between the first direction and the second direction.

* * * * *